United States Patent
Furumochi

(10) Patent No.: US 10,863,088 B2
(45) Date of Patent: Dec. 8, 2020

(54) IMAGE CAPTURING APPARATUS AND CONTROL METHOD FOR CAPTURING STILL IMAGES WITHOUT INTERRUPTING VIDEO RECORDINGS

(71) Applicant: CANON KABUSHIKI KAISHA, Tokyo (JP)

(72) Inventor: Hiroyuki Furumochi, Musashimurayama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/448,723

(22) Filed: Jun. 21, 2019

(65) Prior Publication Data

US 2019/0394397 A1 Dec. 26, 2019

(30) Foreign Application Priority Data

Jun. 25, 2018 (JP) ................................ 2018-120038
Apr. 23, 2019 (JP) ................................ 2019-082199

(51) Int. Cl.
*H04N 5/232* (2006.01)
*H04N 5/04* (2006.01)

(52) U.S. Cl.
CPC .......... *H04N 5/23245* (2013.01); *H04N 5/04* (2013.01); *H04N 5/23232* (2013.01)

(58) Field of Classification Search
CPC .. H04N 5/23245; H04N 5/23232; H04N 5/04; H04N 5/343
See application file for complete search history.

(56) References Cited

U.S. PATENT DOCUMENTS 8,130,279 B2 * 3/2012 Masaki .................. H04N 5/232
348/220.1
8,170,097 B2 * 5/2012 Tabatabai ............... H04N 19/70
375/240.01

FOREIGN PATENT DOCUMENTS

JP 2006-025270 A 1/2006

* cited by examiner

*Primary Examiner* — Padma Haliyur
(74) *Attorney, Agent, or Firm* — Cowan, Lieboswitz & Latman, P.C.

(57) ABSTRACT

An image capturing apparatus comprises an image sensor, a readout circuit capable of performing a first readout operation of reading out a first image signal and a second readout operation of reading out a second image signal for which the number of pixels is larger than the number of pixels for the first image signal, a compression circuit that generates a first compressed image signal by compressing the first image signal, and generates a second compressed image signal by compressing the second image signal, a decoding unit configured to decode the first compressed image signal and second compressed image signal, and a control unit configured to perform control so as to transfer the second compressed image signal to the decoding unit during a period during which the decoding unit is not decoding the first compressed image signal.

13 Claims, 24 Drawing Sheets

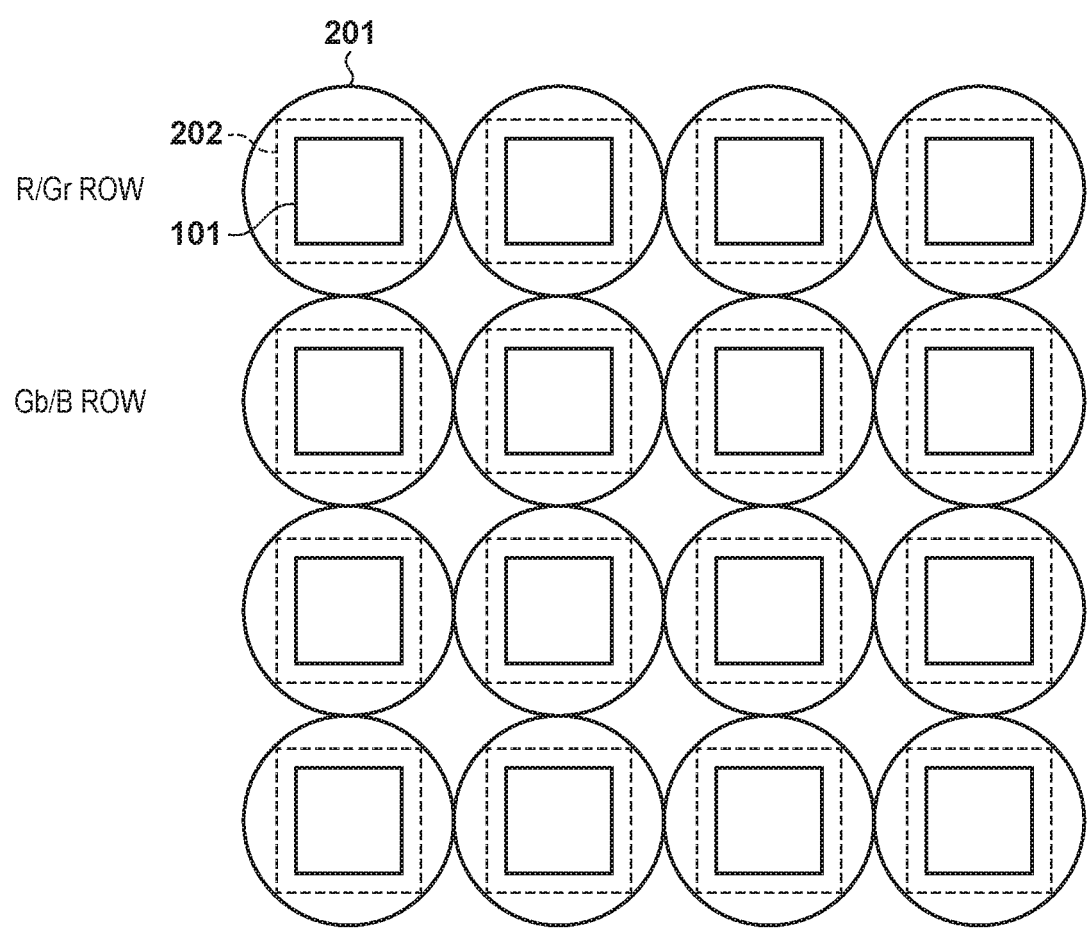

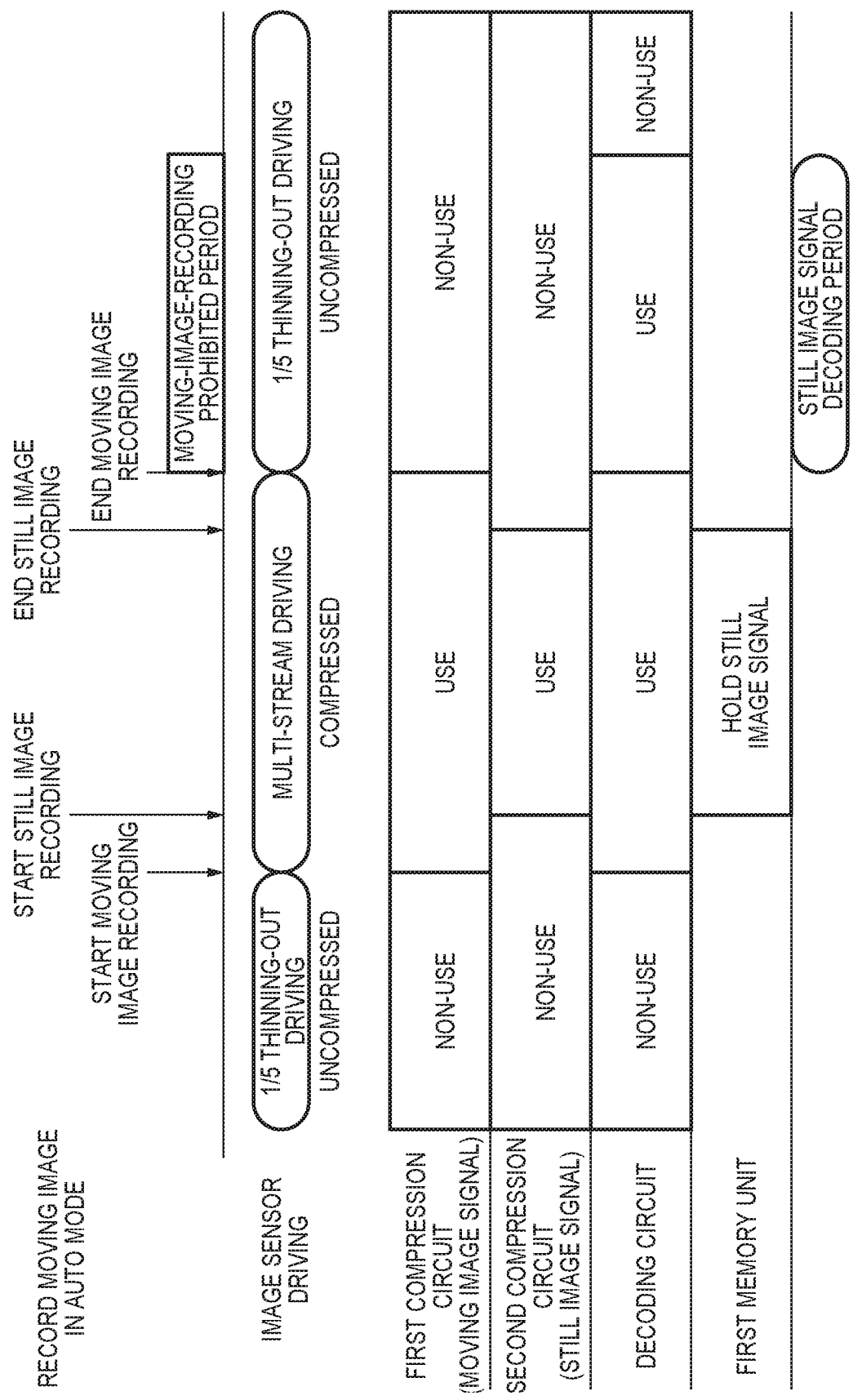

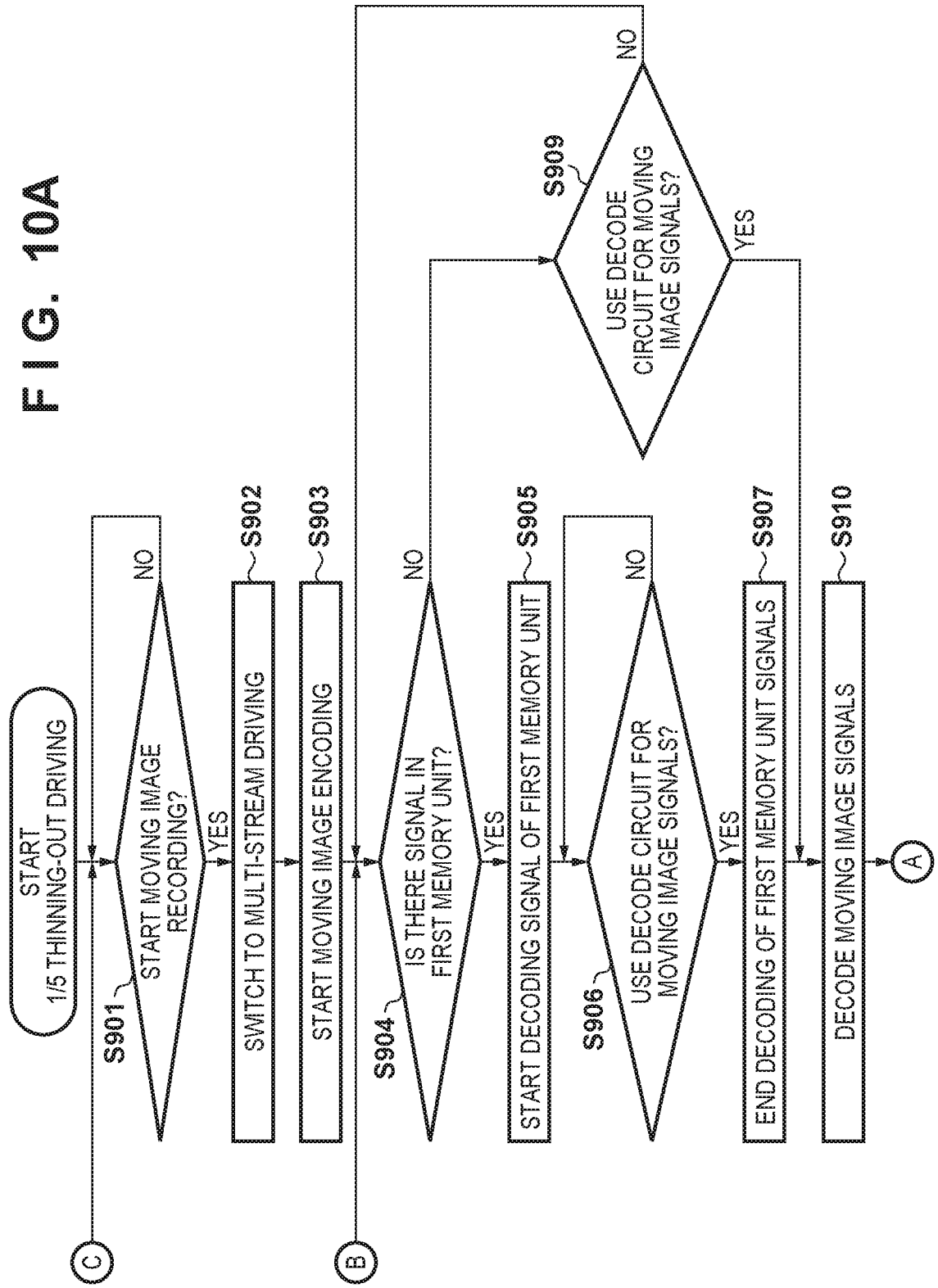

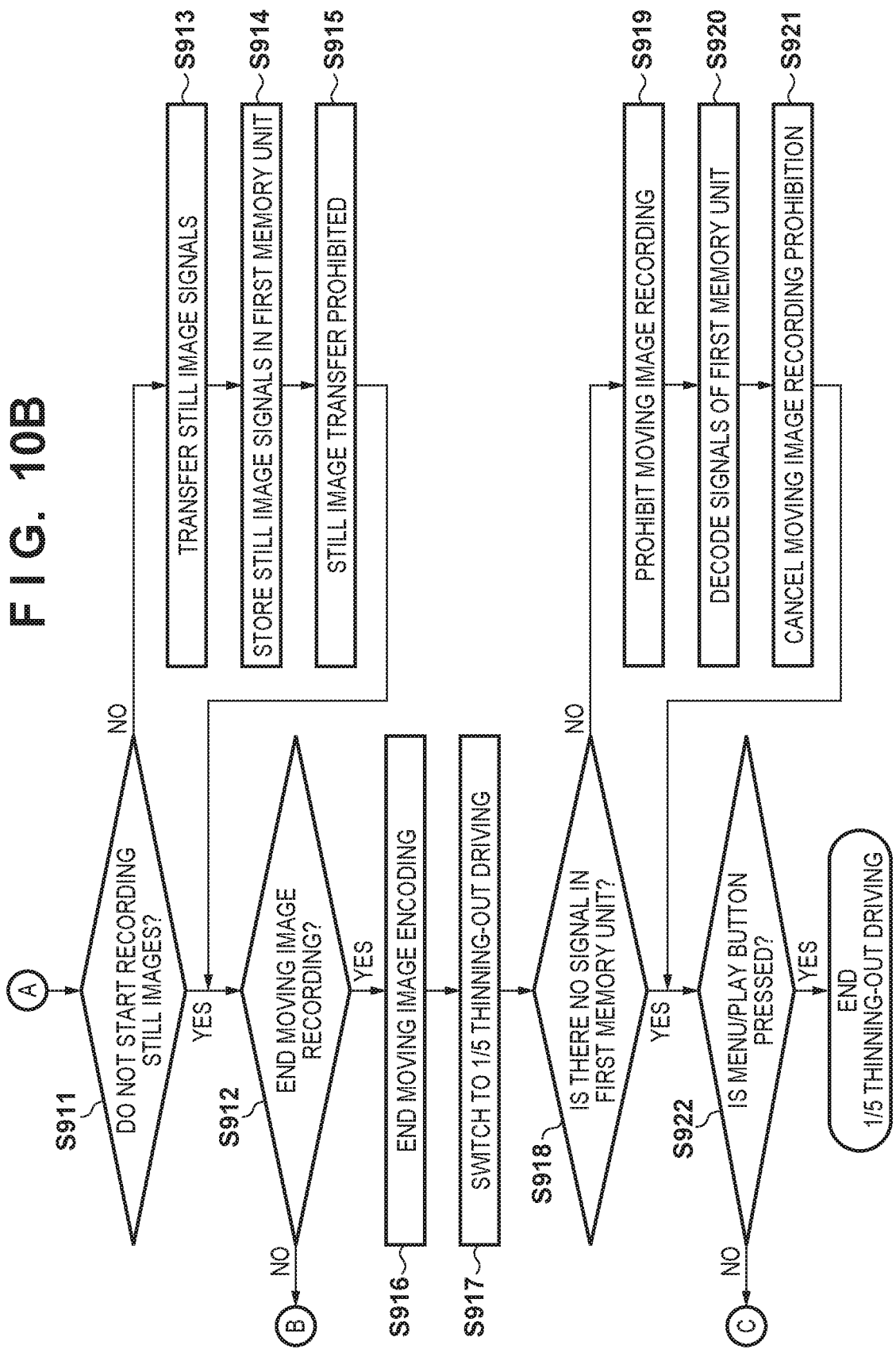

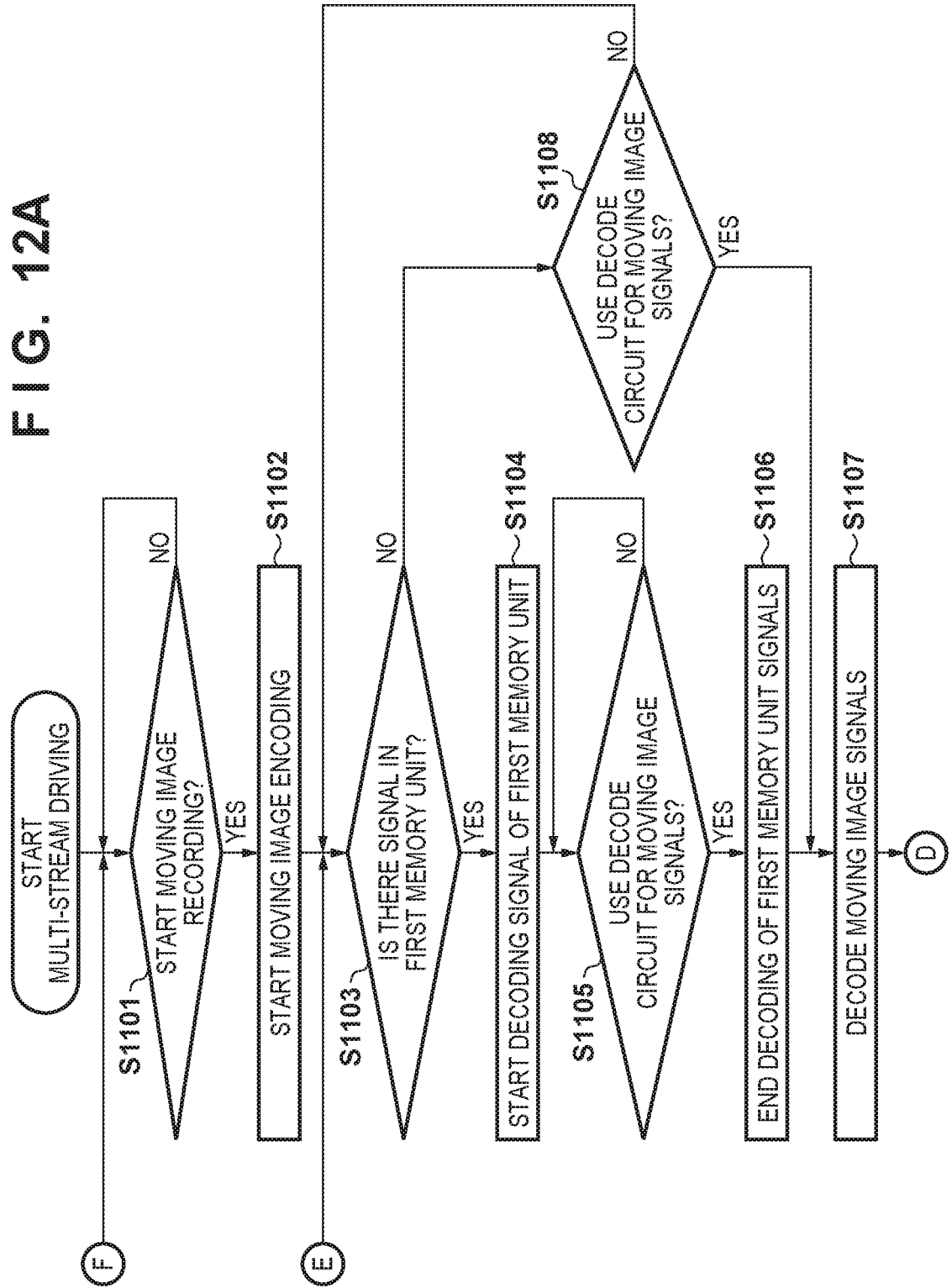

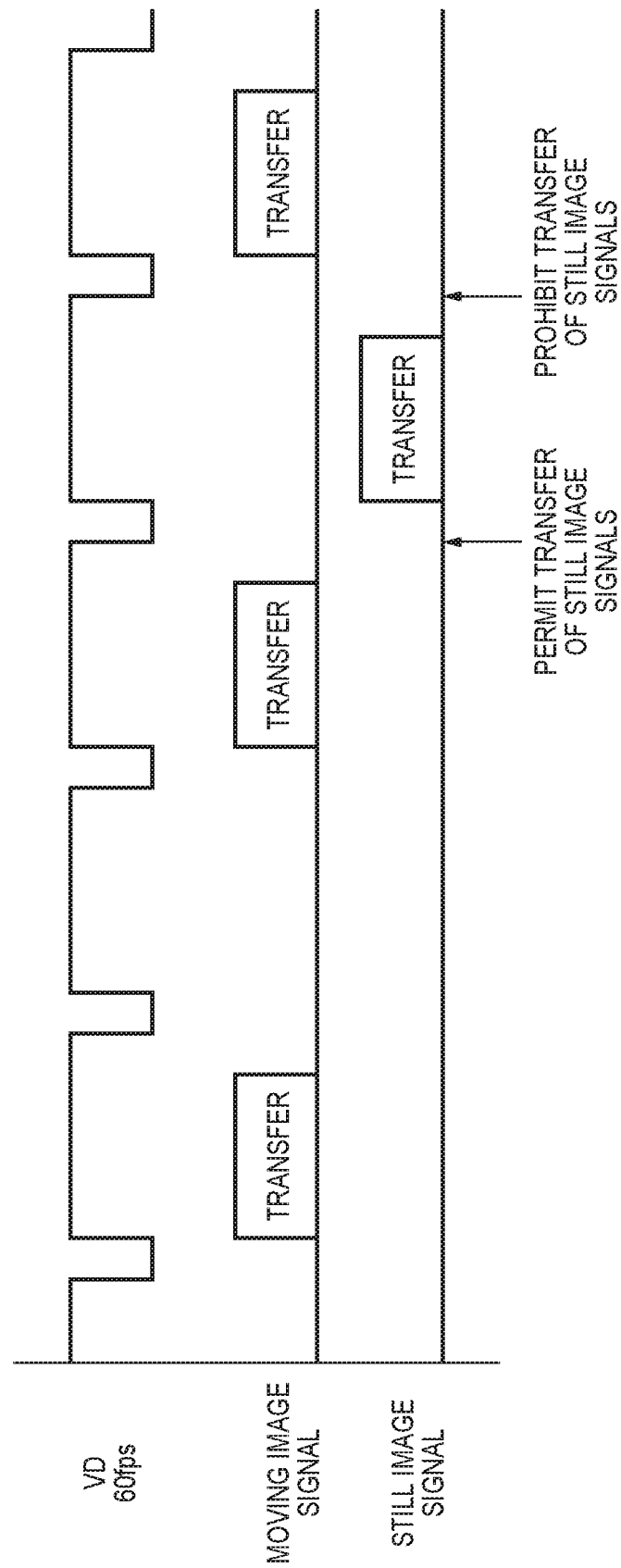

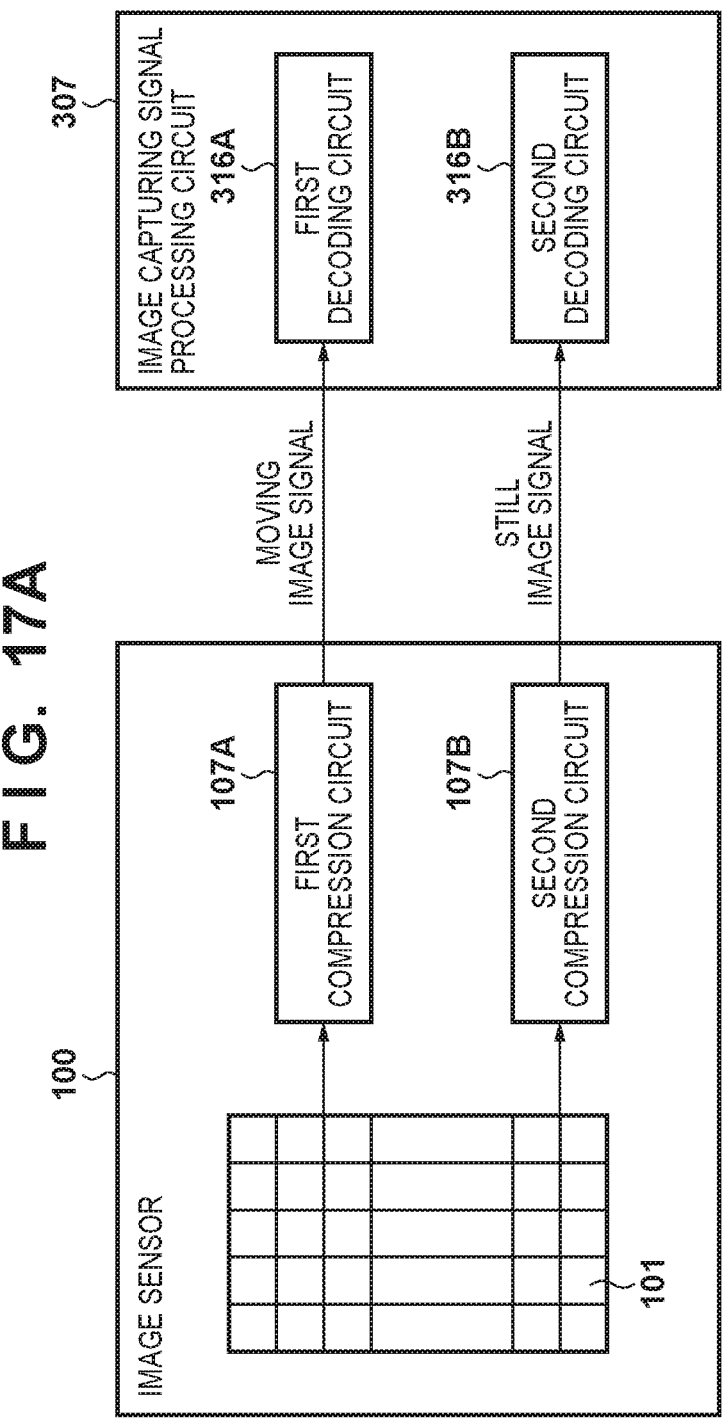

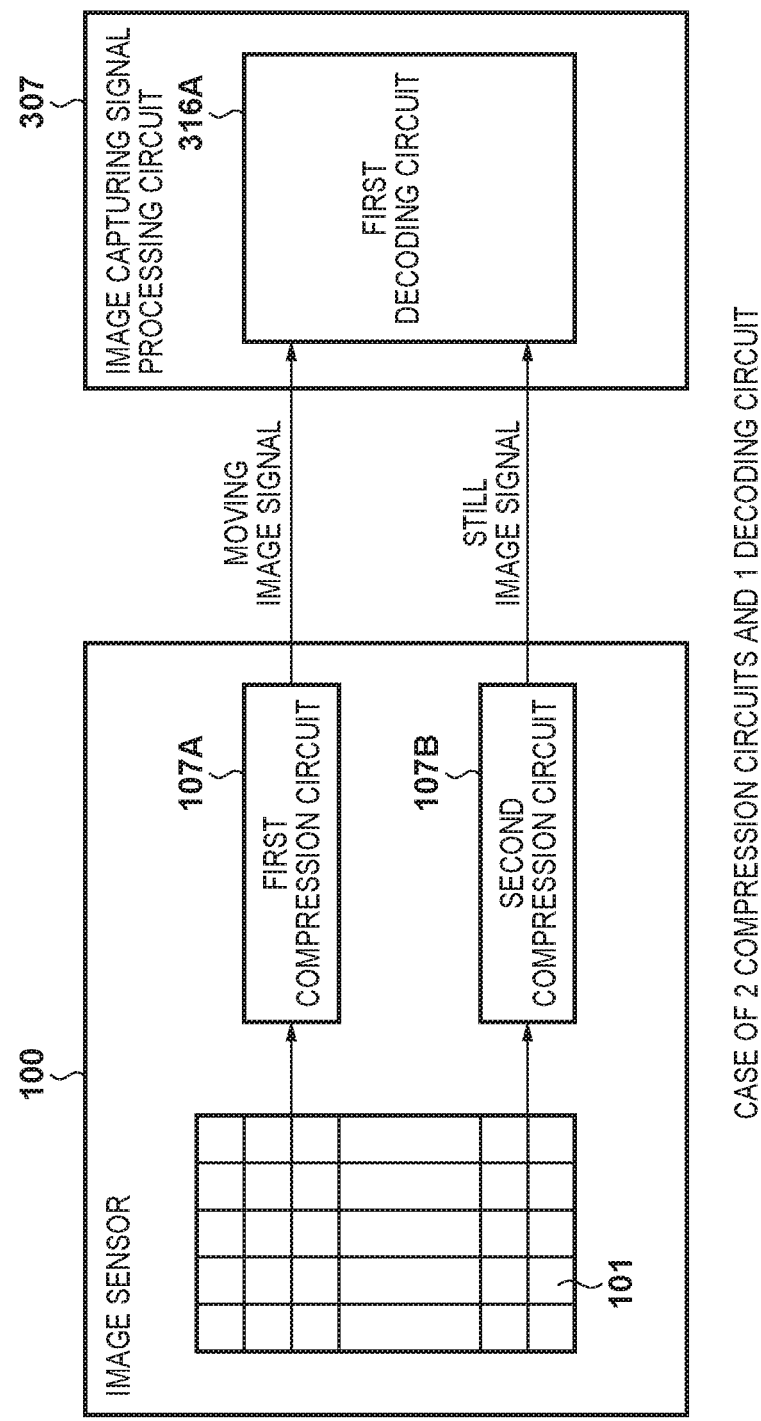

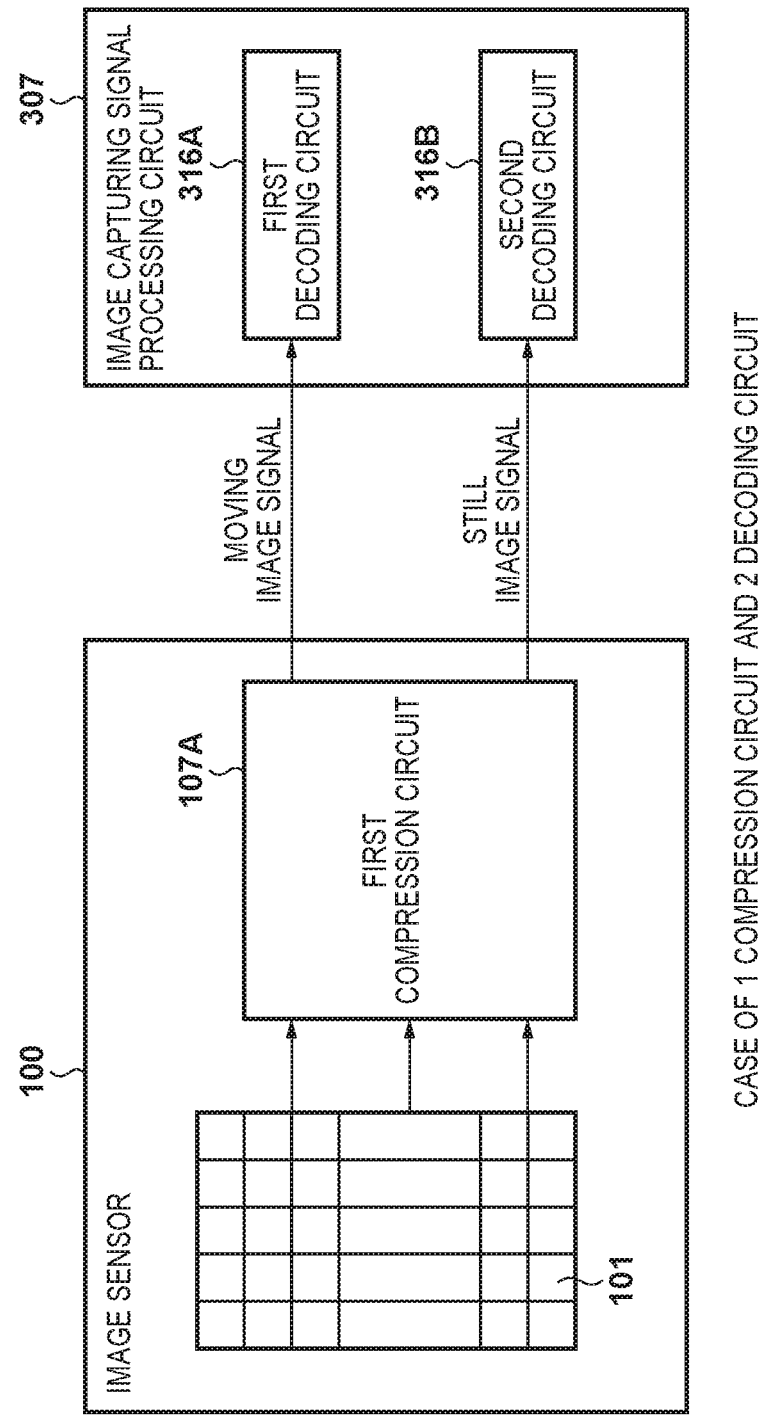

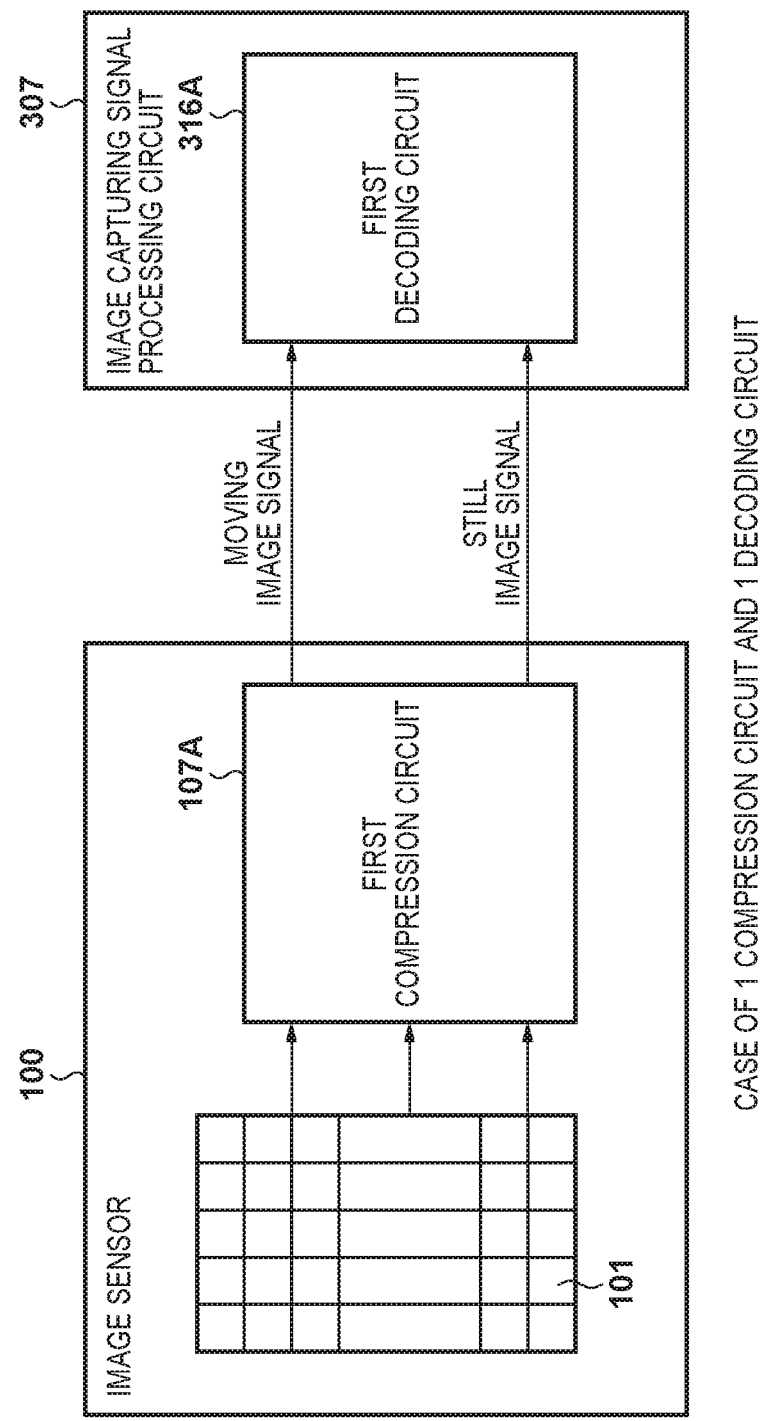

IMAGE CAPTURING APPARATUS AND CONTROL METHOD FOR CAPTURING STILL IMAGES WITHOUT INTERRUPTING VIDEO RECORDINGS

BACKGROUND OF THE INVENTION

Field of the Invention

The present invention relates to an image capturing apparatus and a control method thereof.

Description of the Related Art

In recent years, digital cameras capable of shooting a still image during moving image shooting have been manufactured as products. In such digital cameras, if a still image is shot while a moving image is being shot, a moving image file and a still image file are separately recorded.

In most cases, an ordinary recording size of a moving image is a size called full HD (FHD), and a still image can be recorded by being extracted from the moving image if the size of the still image is the FHD size that is same as the moving image. However, the FHD size is a size that is acquired by thinning out image signals from an image sensor, and thus a resulting photograph has an image quality degraded compared to the original still image. In view of this, when shooting a still image during moving image shooting, moving image shooting is stopped at a timing of still image shooting, a process for switching to driving for capturing a high image quality still image is performed, and a still image is shot. Moving image shooting is then resumed after the still image shooting.

However, in this processing, since a process for stopping moving image shooting is interposed while a moving image is being shot, a problem occurs in which continuity of a moving image file that is recorded is partially interrupted. In order to solve this problem, a technique for outputting image signals for a moving image size and image signals for a still image size at the same time from an image sensor has been proposed. In addition, Japanese Patent Laid-Open No. 2006-25270 discloses execution of processing for compressing image signals in an image sensor.

If the technique described in Japanese Patent Laid-Open No. 2006-25270 is used, in an image capturing signal processing circuit that processes image signals that have been output from the image sensor, a decoding circuit for decoding (expanding) compressed image signals is required. Furthermore, if the above-described configuration is adopted in which image signals for a still image size and image signals for a moving image size can be output from the image sensor at the same time, a problem occurs in that the circuit scale increases since even the image capturing signal processing circuit requires two decoding circuits.

In addition, if there is only one decoding circuit in the image capturing signal processing circuit, a moving image and a still image that are output from the image sensor cannot be received at the same time, and a problem still occurs in that, if still image shooting is performed while a moving image is being recorded, the moving image is interrupted.

SUMMARY OF THE INVENTION

The present invention has been made in light of the above-described problem, and provides an image capturing apparatus that can perform still image shooting without interrupting recording of a moving image regardless of the configuration of the decoding circuit provided in a signal processing circuit.

According to a first aspect of the present invention, there is provided an image capturing apparatus comprising: an image sensor that includes a plurality of pixels for photoelectrically converting light from a subject, a readout circuit capable of performing a first readout operation of reading out a first image signal from the plurality of pixels and a second readout operation of reading out a second image signal for which the number of pixels is larger than the number of pixels for the first image signal, and a compression circuit that generates a first compressed image signal by compressing the first image signal read out by the readout circuit, and generates a second compressed image signal by compressing the second image signal read out by the readout circuit; and at least one processor or circuit configured to function as: a decoding unit configured to decode the first compressed image signal and second compressed image signal that have been output from the image sensor, and a control unit configured to perform control so as to transfer the second compressed image signal to the decoding unit during a period during which the decoding unit is not decoding the first compressed image signal.

According to a second aspect of the present invention, there is provided a method for controlling an image capturing apparatus that includes an image sensor that includes a plurality of pixels for photoelectrically converting light from a subject, the method comprising: a first readout operation of reading out a first image signal from the plurality of pixels; a second readout operation of reading out a second image signal for which the number of pixels is larger than the number of pixels for the first image signal; generating a first compressed image signal by compressing the first image signal read out in the first readout operation, and generating a second compressed image signal by compressing the second image signal read out in the second readout operation; decoding the first compressed image signal and second compressed image signal; and performing control so as to transfer the second compressed image signal for the decoding during a period during which the first compressed image signal is not decoded in the decoding.

Further features of the present invention will become apparent from the following description of exemplary embodiments with reference to the attached drawings.

BRIEF DESCRIPTION OF THE DRAWINGS

FIG. 3 is a diagram showing the pixel array of the image sensor in the first embodiment.

FIG. 9 is a timing diagram of the image capturing signal processing circuit in the first embodiment.

FIGS. 10A and 10B are flowcharts showing operations of the image capturing apparatus in the first embodiment.

FIGS. 12A and 12B are flowcharts showing operations of the image capturing apparatus in the first embodiment.

FIG. 13 is a diagram showing control timings of an image sensor in a second embodiment.

FIGS. 17A to 17D are diagrams showing a combination of compression circuits and decoding circuits in the fourth embodiment.

DESCRIPTION OF THE EMBODIMENTS

Embodiments of the present invention will be described below in detail with reference to the drawings.

First Embodiment

Figure 1A:
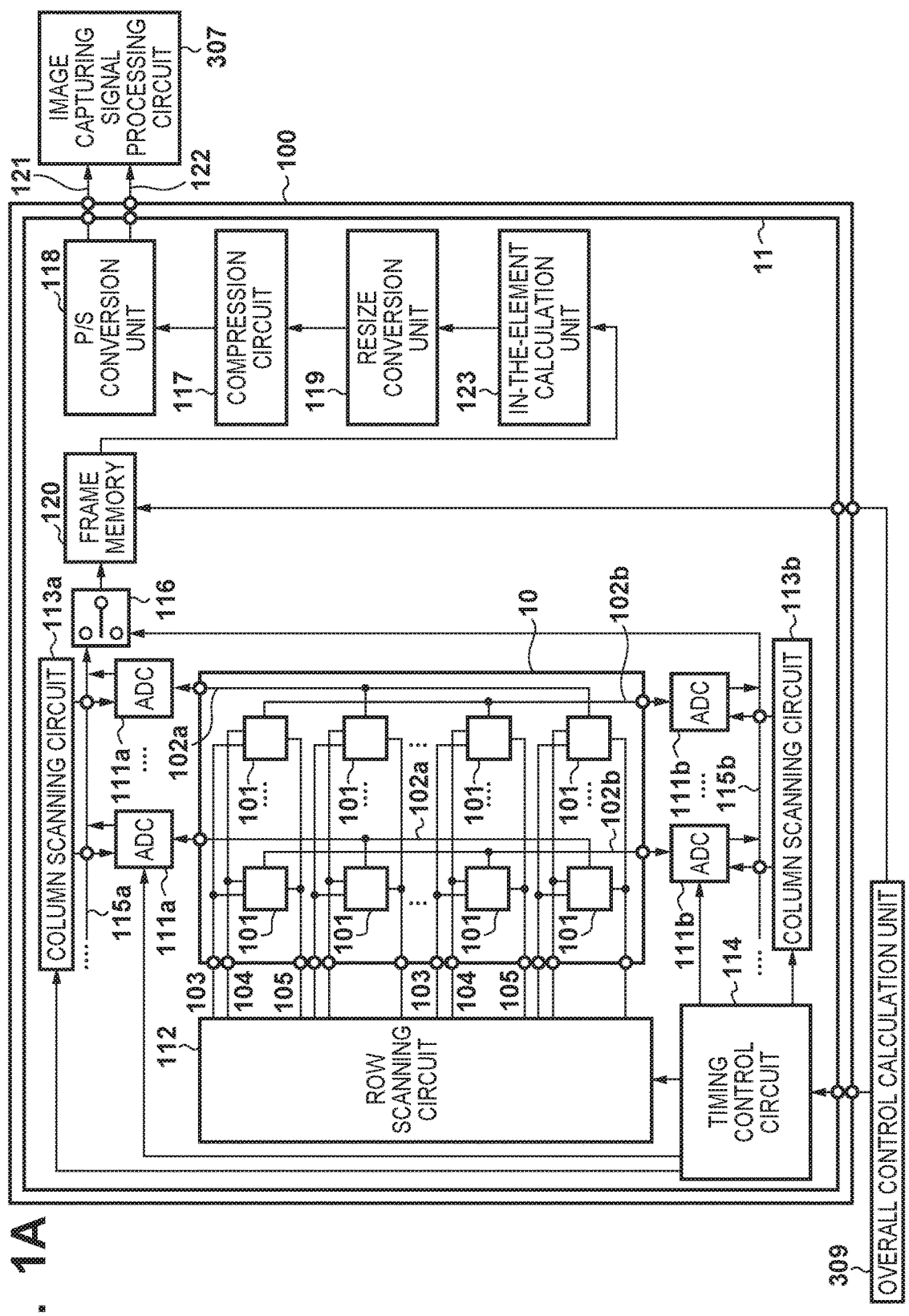
FIGS. 1A and 1B are diagrams showing the configuration of an image sensor in an image capturing apparatus of a first embodiment.
Figure 1B:
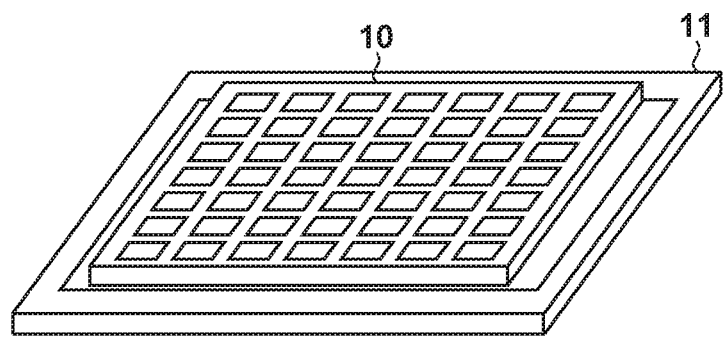

FIG. 1A is a block diagram showing the configuration of an image sensor 100 in a first embodiment of the present invention, and FIG. 1B is a schematic diagram showing the outer appearance of the image sensor 100. As shown in FIG. 1B, the image sensor 100 is formed of a first semiconductor chip 10 (image capturing layer) and a second semiconductor chip 11 (circuit layer), and the first semiconductor chip 10 is stacked on the second semiconductor chip 11.

In the first semiconductor chip 10, a pixel portion consisting of a plurality of pixels 101 that are arranged in a matrix is arranged on the light incident side, in other words the light receiving side of an optical image. The pixels 101 arranged in a matrix on the first semiconductor chip 10 are connected to transfer signal lines 103, reset signal lines 104, and row select signal lines 105 in the horizontal direction (row direction) in units of rows. Meanwhile, the pixels 101 are connected to column output lines 102a or 102b in the vertical direction (column direction). Pixels 101 connected to the column output lines 102a are designated as a first pixel group, and pixels 101 connected to the column output line 102b are designated as a second pixel group.

On the second semiconductor chip 11, a column ADC block 111a and a column ADC block 111b are provided for each column, and pixel driving circuits such as a row scanning circuit 112, column scanning circuits 113a and 113b, and a timing control circuit 114 are formed. Furthermore, a selector switch 116, a frame memory 120, an in-the-element calculation unit 123, a resize conversion unit 119, a compression circuit 117, and a parallel-serial conversion unit (hereinafter, a P/S conversion unit) 118 are also formed.

By forming the pixels 101 on the first semiconductor chip 10 and forming pixel driving circuits, a memory circuit, a calculation circuit, and the like on the second semiconductor chip 11 in this manner, manufacturing processes can be separated between the image capturing layer and the circuit layer of the image sensor 100. As a result, it is possible to thin the thickness of the interconnect in the circuit layer, increase the speed through densification, increase the size, and advance the functionalities.

In the pixels 101 of the image sensor 100, accumulation and readout of electric charges are controlled by a control signal from the row scanning circuit 112 via the transfer signal lines 103, the reset signal lines 104, and the row select signal lines 105. Signals are then read out from pixels 101 in a row selected by the row scanning circuit 112. In this embodiment, two types of output channels are provided as output channels. A first output channel is constituted by the column ADC block 111a, a column scanning circuit 113b, and a signal line 115a, and a second output channel is constituted by the column ADC block 111b, the column scanning circuit 113a, and the signal line 115a. Accordingly, signals can be read out from pixels 101 of two rows in parallel.

Signals read out from the pixels 101 of the first pixel group are sent to the column ADC blocks 111a of the first output channel via the column output lines 102a of the respective columns, and are subjected to AD conversion. Also, signals read out from the pixels 101 of the second pixel group are sent to the column ADC blocks 111b of the second output channel via the column output line 102b of the respective columns, and are subjected to AD conversion. After that, columns from which signals are read out are sequentially selected by the column scanning circuit 113a or 113b, and image signals that underwent AD conversion are output to the selector switch 116 via the signal line 115a or 115b. Note that it is also possible to read out signals from pixels 101 of every other row using one of the first and second output channels.

The timing control circuit 114 sends a timing signal to the row scanning circuit 112, the column ADC blocks 111a and 111b, and the column scanning circuits 113a and 113b based on control from an overall control calculation unit 309.

The selector switch 116 is a switch for selectively outputting image signals that are output from the signal lines 115a and 115b, sequentially to the frame memory 120. The frame memory 120 temporarily stores image signals that have been output, as image data.

The in-the-element calculation unit 123 performs calculations of resize processing and compression processing of image data according to a driving mode. The resize conversion unit 119 resizes image data stored in the frame memory 120 to a required field angle based on a result of calculation of the in-the-element calculation unit 123, and outputs the resized image data to the compression circuit 117.

The compression circuit 117 performs a compression operation of image signals using a compression technique such as the wavelet conversion technique. The compression circuit 117 can also perform a switch to performing or not performing compression, conversion of a compression rate, and the like. Note that the compression technique is not limited to the wavelet conversion technique. When compression is performed, the bit accuracy deteriorates, and thus there are cases where the image quality is degraded, but since unnecessary components such as noise are removed, noise is reduced in some cases.

Note that, if processing such as resizing or compression is not required, image signals are transferred directly from the selector switch 116 to the P/S conversion unit 118. The P/S conversion unit 118 performs parallel-serial conversion on the image data, and transmits the image data to an image capturing signal processing circuit 307 that is outside of the image sensor 100.

The image sensor 100 and the image capturing signal processing circuit 307 are connected using a plurality of lanes, and according to the driving mode, signals of different pixels and signals of the same pixels are sorted into a main stream 121 and a sub stream 122, or are output only from the main stream 121. By performing multi-stream driving in which two types of image signals are output from the image sensor 100 in parallel in this manner, it is possible to output image signals from the image sensor 100 at a high speed.

In addition, as a readout driving technique of the image sensor 100, driving for reading out pixel signals of all of the pixels without reducing the number of pixels, readout driving for reducing the number of pixels by thinning out the pixels in the vertical direction to ⅓ or ⅕, readout driving for reducing the number of pixels by adding a plurality of pixel signals in the horizontal direction, vertical thinning-out horizontal addition driving, and the like can be selected. It is also possible to select multi-stream driving for performing output for driving for reading out all of the pixels and ⅓ vertical thinning-out horizontal addition driving at the same time.

In this embodiment, for example, full-pixel readout driving is executed for reading of still image shooting, and ⅕ vertical thinning-out horizontal addition driving is executed for reading out moving image signals in a standby state before still image shooting. In addition, for example, when performing still image shooting while recording a moving image, multi-stream driving is executed in which the image sensor 100 is driven in full-pixel readout driving so as to output still image signals, and the image sensor 100 is driven in ⅓ vertical thinning out horizontal addition driving so as to output moving image signals. Accordingly, in either case, the total number of pixels of still image signals is larger than the total number of pixels of moving image signals.

Figure 2A:
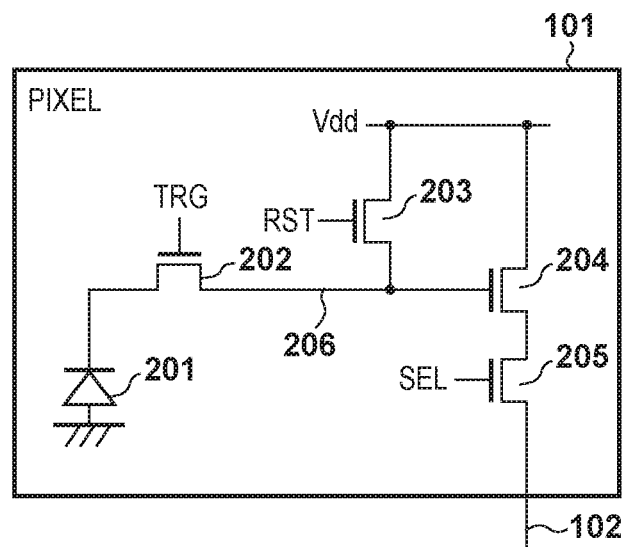
FIGS. 2A and 2B are diagrams showing an exemplary configuration of a pixel and a column ADC block in the first embodiment.
Figure 2B:
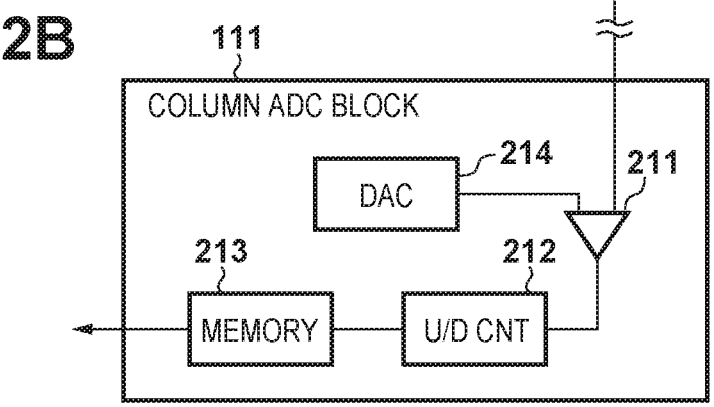

FIGS. 2A and 2B are diagrams showing the configuration of one pixel 101 of the image sensor 100 in this embodiment and details of one column ADC block 111. Operations of the image sensor 100 in the embodiment of the present invention will be schematically described with reference to FIGS. 1A to 2B. Note that the column ADC block 111a and the column ADC block 111b have the same configuration, and thus are referred to as "column ADC block 111" in FIGS. 2A and 2B.

In FIGS. 2A and 2B, a photodiode (PD) 201 included in each pixel 101 photoelectrically converts received light into photocharges (here, electrons) of an electric charge amount corresponding to the amount of the received light. A transfer transistor 202 is connected between the cathode of the PD 201 and the gate of an amplification transistor 204, and is turned on by providing a transfer pulse φTRS to its gate via the transfer signal line 103. A node electrically connected to the gate of the amplification transistor 204 constitutes a floating diffusion (FD) portion 206. As a result of the transfer transistor 202 being turned on by the transfer pulse φTRS, photocharges that are generated by photoelectric conversion in the PD 201 is transferred to the FD portion 206.

A reset transistor 203, whose drain is connected to the pixel power supply Vdd, and whose source is connected to the FD portion 206, is turned on as a result of providing a reset pulse φRST to its gate via the reset signal line 104. In addition, by turning on the reset transistor 203 before photocharges are transferred from the PD 201 to the FD portion 206, charges in the FD portion 206 are reset to the pixel power supply Vdd.

The gate of the amplification transistor 204 is connected to the FD portion 206, and the drain of the amplification transistor 204 is connected to the pixel power supply Vdd. In addition, the drain of a selection transistor 205 is connected to the source of the amplification transistor 204, the source of the selection transistor 205 is connected to the column output line 102, and the selection transistor 205 is turned on as a result of providing a selection pulse φSEL to its gate via the row select signal line 105.

While the selection transistor 205 is in an on state, the potential of the FD portion 206 after being reset by the reset transistor 203 is first output as a reset level to the column output line 102. Furthermore, as a result of the transfer transistor 202 being turned on, the potential of the FD portion 206 after photocharges are transferred is output as a signal level to the column output line 102. In this embodiment, N-channel MOS transistors are used as the transistors 202 to 205.

Note that the configuration of the pixel 101 is not limited to the above-described configuration, and, for example, a circuit configuration can also be adopted in which the selection transistor 205 is connected between the pixel power supply Vdd and the drain of the amplification transistor 204. In addition, there is no limitation to the above-described four-transistor configuration, for example, a three-transistor configuration may be adopted in which the amplification transistor 204 and the selection transistor 205 are provided.

A signal that is output from each pixel 101 via the column output line 102 is transmitted to the column ADC block 111. The column ADC block 111 has a comparator 211, an up-down counter (U/D CNT) 212, a memory 213, and a DA convertor (DAC) 214.

In the comparator 211, the column output line 102 is connected to one of a pair of input terminals, and the DAC 214 is connected to the other. The DAC 214 outputs a ramp signal whose signal level changes in a ramp-shaped manner with the lapse of time based on a reference signal that is input from the timing control circuit 114. The comparator 211 then compares the level of the ramp signal that is input from the DAC 214 with the level of the signal that is input from the column output line 102. The timing control circuit 114 outputs a reference signal to the DAC 214 based on an instruction from the overall control calculation unit 309.

For example, if the level of an image signal is lower than the level of the ramp signal, the comparator 211 outputs a high-level comparison signal, and, if the level of the image signal is higher than the level of the ramp signal, outputs a low-level comparison signal. The up-down counter 212 is connected to the comparator 211, and counts a period during which the comparison signal is at a high or low level, for example.

In this counting processing, an output signal of each pixel 101 is converted into a digital value. Note that a configuration may be adopted in which an AND circuit is provided between the comparator 211 and the up-down counter 212, a pulse signal is input to this AND circuit, and the up-down counter 212 counts the number of above-mentioned pulse signals.

The memory 213 is connected to the up-down counter 212, and stores a count value counted by the up-down counter 212. Note that a configuration may be adopted in which, in each column ADC block 111, count values corresponding to reset levels of the pixels 101 are counted, then, count values corresponding to signal levels after a predetermined image-capturing time are counted, and these difference values are stored in the memory 213. Subsequently, the count values stored in the memory 213 are transmitted as image signals to the selector switch 116 via the signal line 115a or the signal line 115b, in synchronization with signals from the column scanning circuit 113a or 113b.

Note that the column ADC blocks 111 are not limited to the above-described configuration, and it is needless to say that a known column ADC may be used.

FIG. 3 is a diagram schematically showing the pixel array of the image sensor 100 in this embodiment. Bayer array is applied to the color filters, and, in the pixels in odd-numbered rows, red (R) and green (Gr) color filters are alternately provided from the left in the stated order. Also, in the pixels in even-numbered rows, green (Gb) and blue (B) color filters are alternately provided from the left in the stated order. In addition, an on-chip microlens 201 is formed on a color filter 202.

Figure 4:
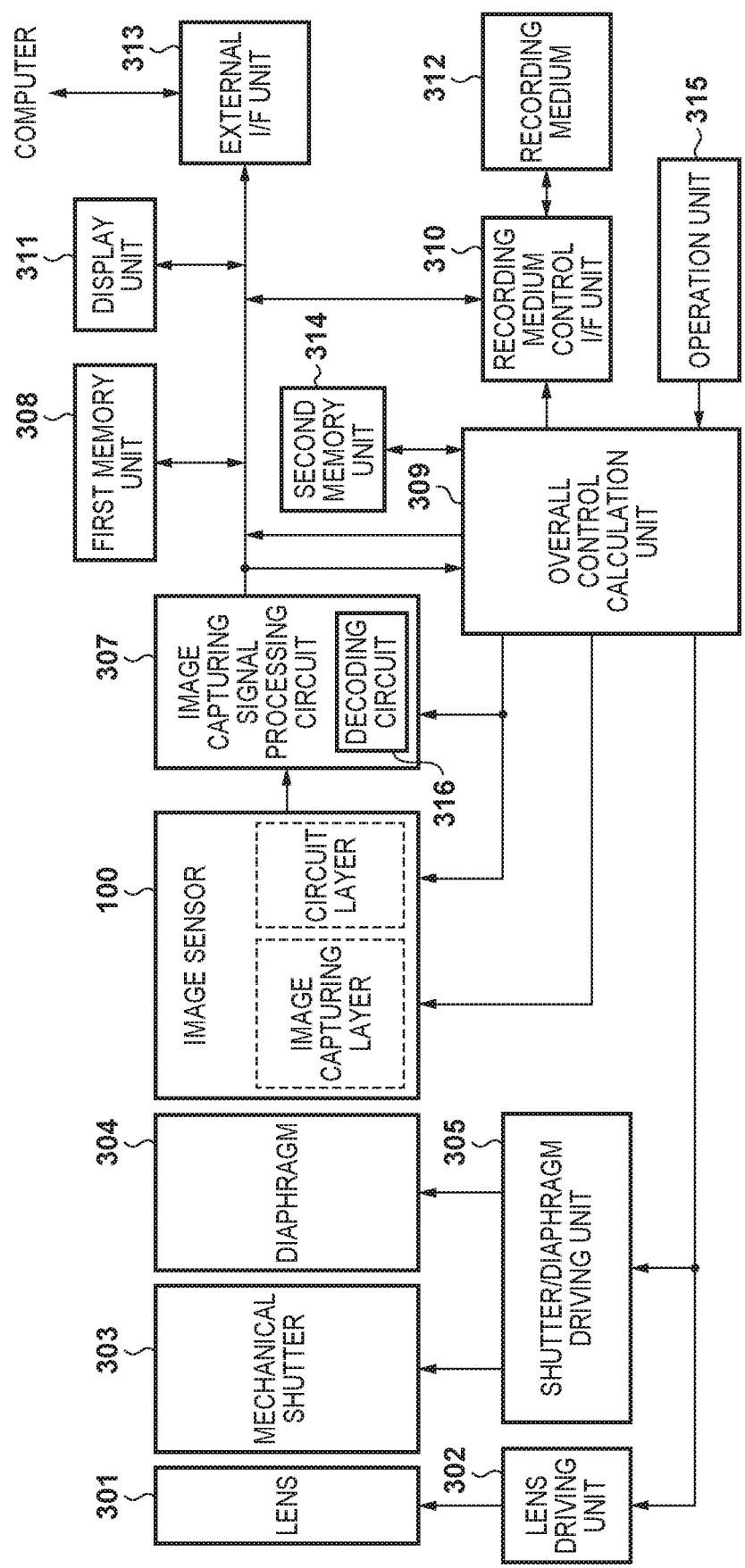
FIG. 4 is a block diagram showing the configuration of the image capturing apparatus of the first embodiment.

FIG. 4 is a block diagram showing the configuration of an image capturing apparatus 300 in which the image sensor in this embodiment described with reference to FIGS. 1A to 3 is used.

In FIG. 4, the image capturing apparatus 300 is provided with a lens 301, a lens driving unit 302, a mechanical shutter (hereinafter, "mechanical shutter") 303, a diaphragm 304, a shutter/diaphragm driving unit 305, the image sensor 100, and the image capturing signal processing circuit 307 that internally includes a decoding circuit 316.

In addition, the image capturing apparatus 300 is provided with a first memory unit 308, the overall control calculation unit 309, a recording medium control interface unit (hereinafter, "recording medium control I/F unit") 310, a display unit 311, a recording medium 312, and an external interface unit (hereinafter, "external I/F unit") 313. The image capturing apparatus 300 is further provided with a second memory unit 314 and an operation unit 315.

Reflected light from a subject that has passed through the lens 301 is adjusted to an appropriate light amount using the diaphragm 304, and is formed into a subject image on the imaging plane of the image sensor 100. The subject image formed on the imaging plane of the image sensor 100 is photoelectrically converted in the pixels 101, and is further subjected to gain adjustment and A/D conversion from analog signals into digital signals, which are transmitted as R, Gr, Gb, and B signals to the image capturing signal processing circuit 307.

Image signals compressed in the image sensor 100 are subjected to decoding processing that is performed by the decoding circuit 316 in the image capturing signal processing circuit 307. In addition, the image capturing signal processing circuit 307 performs predetermined calculation processing using image capturing signals, and the overall control calculation unit 309 performs exposure control and automatic focus adjustment control based on the obtained calculation result. Accordingly, AE (automatic exposure control) processing and EF (flash automatic dimming and light emitting control) processing of a TTL (through the lens) system are performed.

Furthermore, the image capturing signal processing circuit 307 performs predetermined calculation processing using image signals of a capture image, and also performs AWB (automatic white balance) processing of the TTL system based on the obtained calculation result. In addition, various types of image capturing signal processing such as low-pass filter processing for reducing noise and shading processing, as well as various corrections, compression of image signals, and the like are performed.

Driving control of zooming, focusing, and the like of the lens 301 is performed by the lens driving unit 302. Driving control of the mechanical shutter 303 and the diaphragm 304 is performed by the shutter/diaphragm driving unit 305. The overall control calculation unit 309 performs overall control of the image capturing apparatus 300 and various calculations.

The first memory unit 308 temporarily stores image signals. The recording medium control interface unit 310 records or reads out image signals to or from a recording medium. The display unit 311 displays image signals. The recording medium 312 is a removable recording medium such as a semiconductor memory, and records or reads out image signals.

The external interface unit 313 is an interface for communicating with an external computer and the like. The second memory unit 314 stores calculation results of the overall control calculation unit 309. The user can set a driving condition of the image capturing apparatus 300 using the operation unit 315, this information is sent to the overall control calculation unit 309, and overall control of the image capturing apparatus 300 is performed. The operation unit 315 includes operation members such as a menu button for the user to perform setting of the image capturing apparatus and a play button for checking a shot image.

Figure 6:
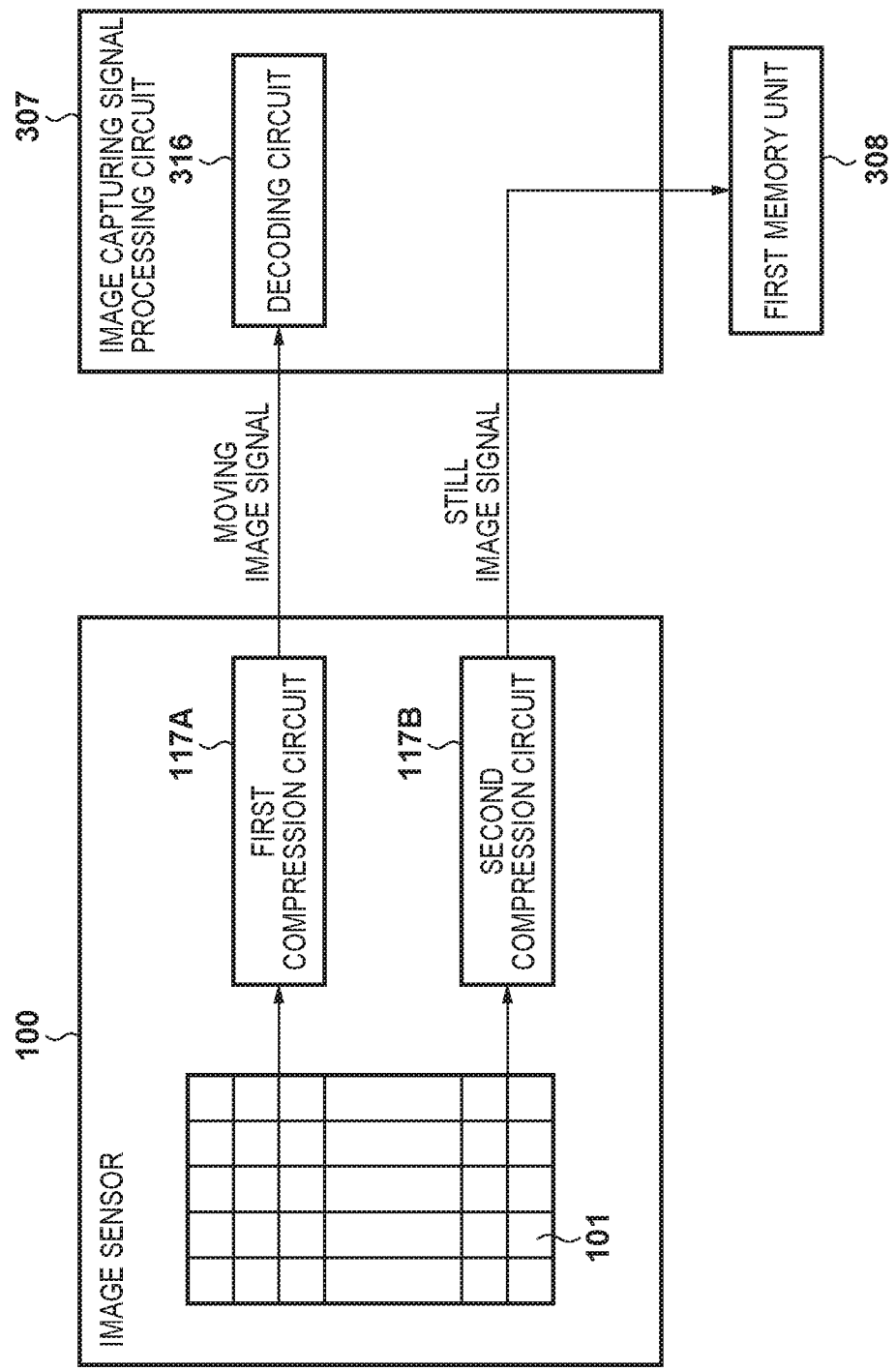
FIG. 6 is a diagram showing a connection state between the image sensor and an image capturing signal processing circuit in the first embodiment.

FIG. 6 is a diagram showing the state of connection between the image sensor 100 and the image capturing signal processing circuit 307 in this embodiment. As shown in FIG. 6, the image capturing signal processing circuit 307 of this embodiment is provided with only one decoding circuit.

The image sensor 100 outputs moving image signals and still image signals at the same time. At this time, the moving image signals are compressed by the first compression circuit 117A, the still image signals are compressed by the second compression circuit 117B, and the compressed moving image signals and still image signals are transferred to the image capturing signal processing circuit 307.

In the image capturing signal processing circuit 307, the moving image signals are subjected to decoding processing that is performed by the decoding circuit 316. Also, the still image signals are temporarily stored to the first memory unit 308 via the image capturing signal processing circuit 307.

Figure 7:
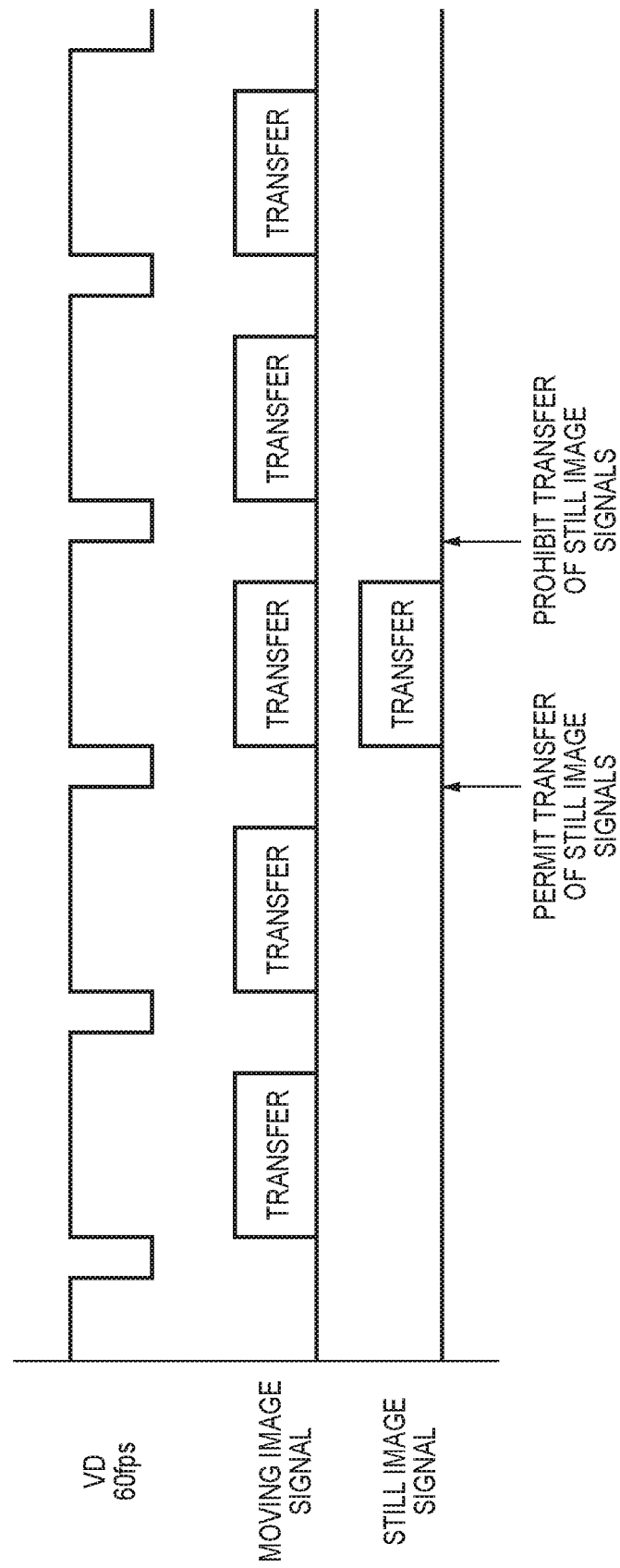
FIG. 7 is a diagram showing control timings of the image sensor in the first embodiment.

FIG. 7 is a control timing diagram of the image sensor 100 in this embodiment. The image sensor 100 transfers moving image signals to the image capturing signal processing circuit 307 at 60 fps (frame/second). On the other hand, regarding still image signals, when an instruction that is based on a user operation on the operation unit 315 is received by the overall control calculation unit 309, and if it is determined that still image shooting is to be started, the overall control calculation unit 309 permits transfer of still image signals of the image sensor 100.

Also, when an instruction that is based on a user operation on the operation unit 315 is received by the overall control calculation unit 309, and if it is determined that still image shooting is to be ended, the overall control calculation unit 309 prohibits transfer of still image signals of the image sensor 100. As a result, the image sensor 100 does not always output moving image signals and still image signals at the same time, and it is possible to perform control so as to output moving image signals and still image signals at the same time only when the still image signals are necessary.

Figure 8:
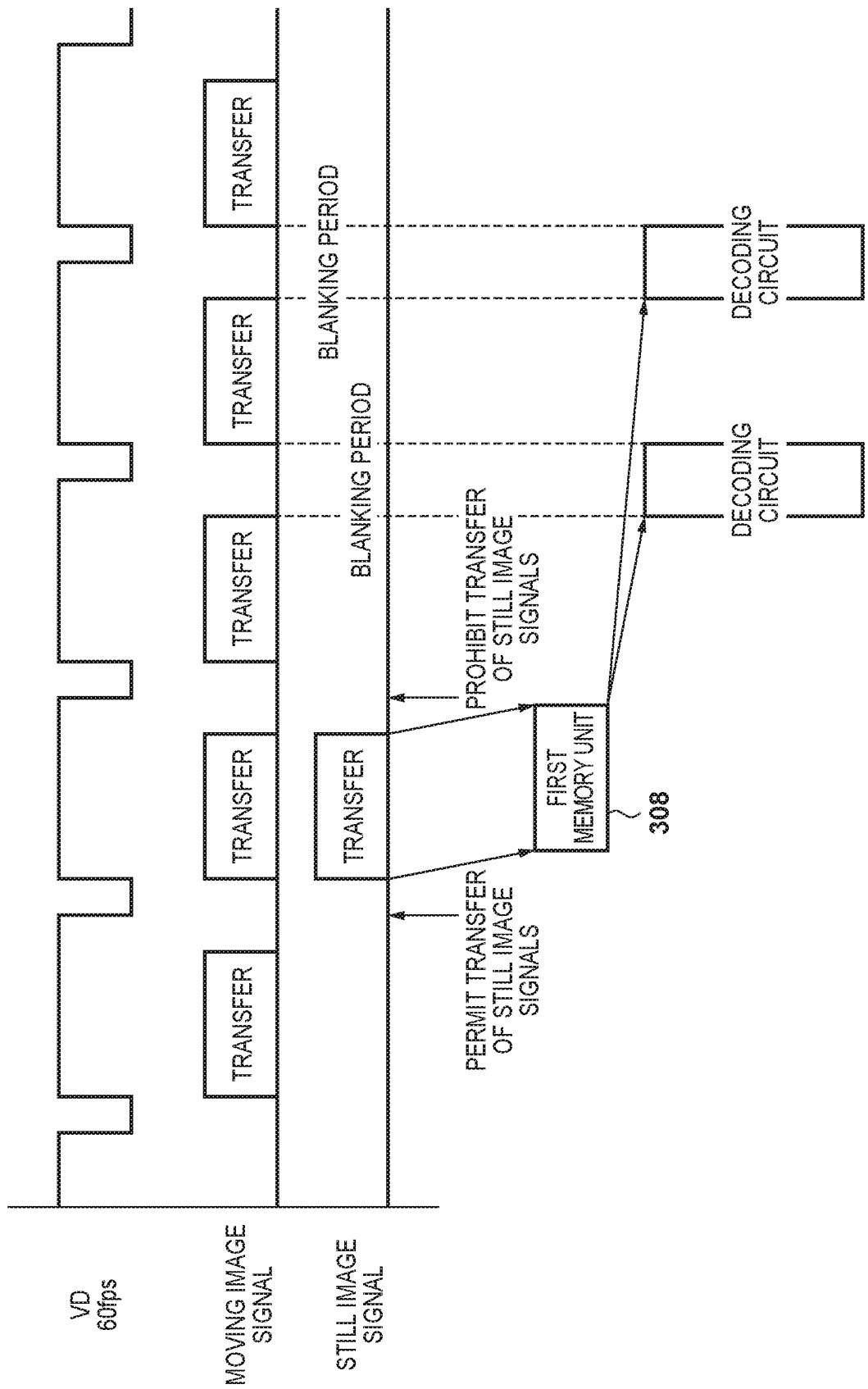
FIG. 8 is a timing diagram of the image capturing signal processing circuit in the first embodiment.

FIG. 8 is a diagram showing timings for decoding still image signals in the image capturing signal processing circuit 307 in this embodiment.

In the image capturing signal processing circuit 307, still image signals temporarily stored in the first memory unit 308 are decoded by the decoding circuit 316 during a blanking period during which moving image signals are not transferred. After the decoding processing is complete, the image capturing signal processing circuit 307 generates a still image, which is recorded in the recording medium 312, and the first memory unit 308 is cleared.

Next, shooting modes will be described. The user can set a shooting mode using the operation unit 315. The shooting modes include an auto mode and a moving image recording mode.

The auto mode is a still image shooting mode in which various parameters of the camera are automatically determined by a program incorporated in the image capturing signal processing circuit 307, based on measured evaluation values.

The moving image recording mode is a mode in which various parameters of the camera are determined to take values appropriate for recording the moving image, by a program incorporated in the image capturing signal processing circuit 307 based on measured evaluation values.

Note that a moving image can be recorded in the auto mode, but readout methods of the image sensor 100 are different before and after recording of the moving image is started, and thus it is necessary to temporarily suspend transfer of image signals from the image sensor 100.

FIG. 9 is a diagram showing timings for recording a moving image and a still image in the auto mode in this embodiment. FIG. 9 also shows the usage states of the first and second compression circuits 117A and 117B of the image sensor 100 and the decoding circuit 316 of image capturing signal processing circuit.

Before recording of a moving image is started, the image sensor 100 operates in ⅕ thinning-out driving, and the first and second compression circuits 117A and 117B and the decoding circuit 316 are in a non-use state. After this, when an instruction that is based on a user operation on the operation unit 315 is received by the overall control calculation unit 309, and if it is determined that recording of a moving image is to be started, the image sensor 100 is switched to multi-stream driving. In this case, the first compression circuit 117A and the decoding circuit 316 are used for compressing and decoding the moving image signals.

Operations during recording of the moving image are the same as the timing control described with reference to FIG. 8, and only when still image shooting is performed, the second compression circuit 117B is used. At this time, still image signals are stored to the first memory unit 308. In addition, when an instruction that is based on a user operation on the operation unit 315 is received by the overall control calculation unit 309, and if it is determined that recording of the moving image is to be ended, the state before recording of the moving image was started is entered.

At this time, if there is still any still image signal left in the first memory unit 308, the still image signals stored in the first memory unit 308 are decoded by the decoding circuit 316. After the decoding processing is complete, the image capturing signal processing circuit 307 generates a still image, records the still image to the recording medium 312, and clears the first memory unit 308. A moving-image-recording prohibited period is set so as to not start recording a moving image during a period until the first memory unit 308 is cleared, even if an instruction that is based on a user operation on the operation unit 315 is received by the overall control calculation unit 309.

FIGS. 10A and 10B are flowcharts showing the control in FIG. 9. In this embodiment, the image sensor 100 that is waiting for a moving image to be recorded in the auto mode operates in ⅕ thinning out driving. In step S901, the overall control calculation unit 309 determines whether or not the user has instructed to start recording a moving image.

If it is determined in step S901 that it has been instructed to start recording a moving image, the procedure advances to step S902, and if it is determined that it has not been instructed to start recording a moving image, step S901 is repeated. In step S902, the image sensor 100 is switched to multi-stream driving. In step S903, encoding of the moving image is started.

In step S904, it is determined whether or not there is any signal in the first memory unit 308. If there is any signal in the first memory unit 308, the procedure advances to step S905, and if there is no signal, the procedure advances to step S909.

In step S905, processing for decoding the signals in the first memory unit 308 is started. In step S906, whether or not the decoding circuit 316 is used for the moving image signals is determined, and if it is a time period during which the decoding circuit 316 is used for moving image signals, the procedure advances to step S907, and otherwise, the processing for decoding the signals in the first memory unit 308 continues. In step S907, the processing for decoding the signals in the first memory unit 308 is ended, and in step S910, processing for decoding the moving image signals is performed.

On the other hand, in step S909, it is determined whether or not the decoding circuit 316 is used for the moving image signals, and if it is a time period during which the decoding circuit 316 is used for moving image signals, the procedure advances to step S910, and otherwise, the procedure returns to the determination in step S904.

After the moving image signals are decoded in step S910, the overall control calculation unit 309 determines in step S911 whether or not it has been instructed to start still image shooting. If it is determined in step S911 that it has not been instructed to start still image shooting, the procedure advances to step S912, and if it is determined that it has been instructed to start still image shooting, the procedure advances to step S913.

In step S912, it is determined whether or not to end recording of the moving image. If recording of the moving image is to be ended, the procedure advances to step S916, and if recording of the moving image is not to be ended, the procedure returns to step S904.

On the other hand, in step S913, the still image signals are transferred to the image capturing signal processing circuit 307, and in step S914, the transferred still image signals are stored to the first memory unit 308. In step S915, transfer of still image signals is prohibited, and the procedure advances to step S912.

In step S916, encoding of the moving image is ended, and, in step S917, the image sensor 100 is switched to ⅕ thinning-out driving. In step S918, it is determined whether or not there is any signal in the first memory unit 308.

If it is determined in step S918 that there is no signal in the first memory unit 308, the procedure advances to step S922, and if it is determined that there is any signal, the procedure advances to step S919.

In step S919, recording of a moving image is prohibited, and, in step S920, the signals in the first memory unit 308 are decoded. In step S921, prohibition of a moving image recording is canceled, and the procedure advances to step S922.

In step S922, it is determined whether or not an operation member in the operation unit 315 such as the menu button or the play button has been pressed. If an operation member has been pressed, the procedure advances to step S923, and if no operation member has been pressed, the procedure returns to step S901. In step S923, ⅕ thinning-out driving is ended, and the sequence is ended.

Figure 11:
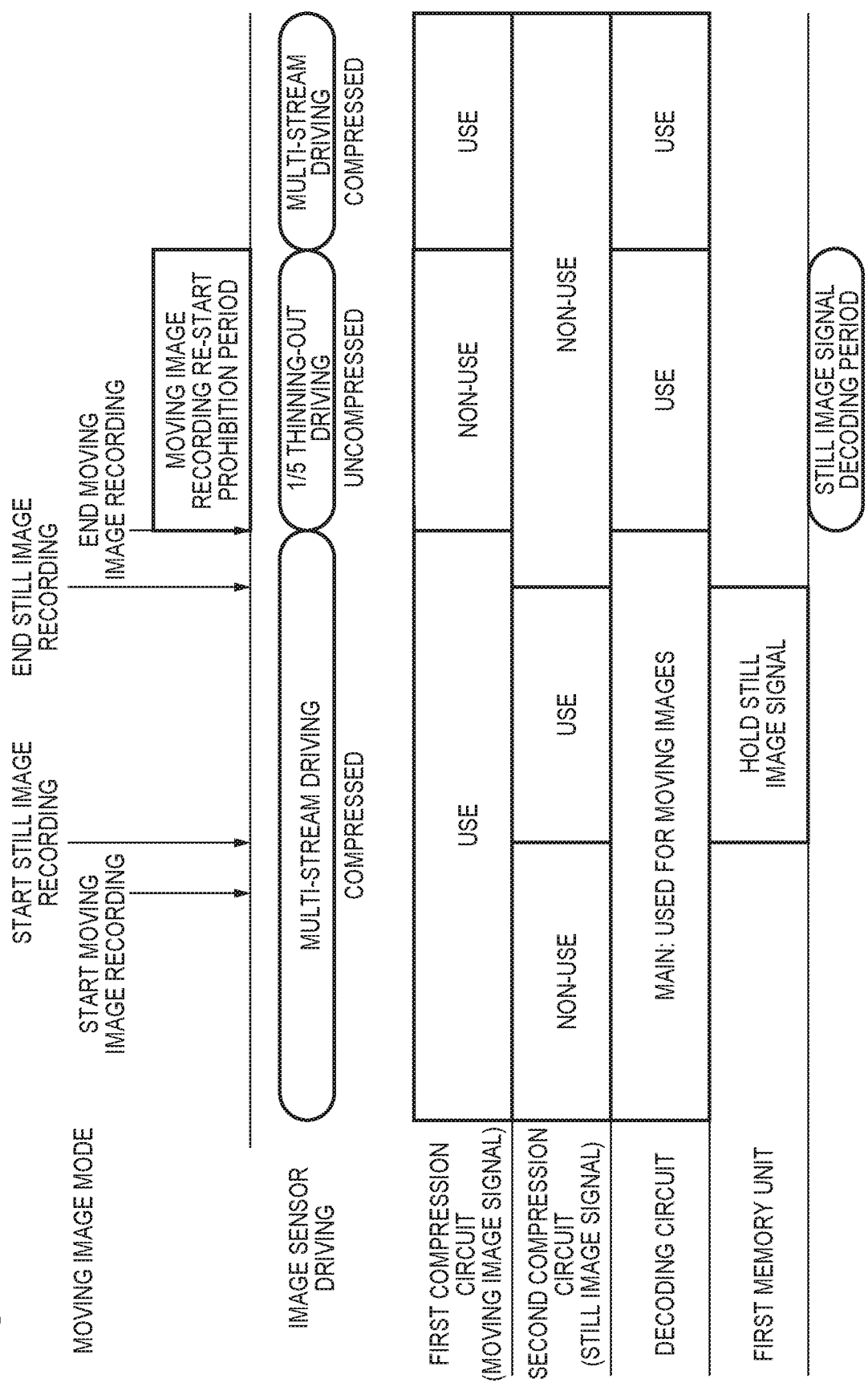
FIG. 11 is a timing diagram of the image capturing signal processing circuit in the first embodiment.

FIG. 11 is a diagram showing timings for recording a moving image and recording a still image in the moving image mode in this embodiment. FIG. 11 also shows the usage states of the first and second compression circuits 117A and 117B of the image sensor 100 and the decoding circuit 316 of the image capturing signal processing circuit 307.

Unlike the processing in the auto mode in FIG. 9, the image sensor 100 operates in multi-stream driving since before recording of a moving image is started. In this case, the first compression circuit 117A and the decoding circuit 316 are used for compressing and decoding the moving image signals.

After this, even if an instruction that is based on a user operation on the operation unit 315 is received by the overall control calculation unit 309, and it is determined that recording of a moving image is to be started, the image sensor 100 does not switch the driving, and recording of a moving image is started.

Operations during recording of a moving image are the same as the timing control described with reference to FIG. 8, and only when still image shooting is performed, the second compression circuit 117B is used. At this time, the still image signals are recorded to the first memory unit 308. After that, when an instruction that is based on a user operation on the operation unit 315 is received by the overall control calculation unit 309, and if it is determined that recording of the moving image is to be ended, and if there is still any still image signal in the first memory unit 308, the decoding circuit 316 performs decoding processing on the still image signals stored in the first memory unit 308.

At this time, the state before recording of the moving image was started is not returned, and a switch is temporarily made to ⅕ thinning-out driving in order to allow the decoding circuit 316 to decode the still image signals. After the decoding processing is complete, the image sensor 100 is returned to the state before recording of the moving image was started, and the image capturing signal processing circuit 307 generates a still image, and records the still image to the recording medium 312. The first memory unit 308 is then cleared. During a period until the first memory unit 308 is cleared, a moving-image-recording prohibited period is set so as to prevent recording of a moving image from being started even if an instruction that is based on a user operation on the operation unit 315 is received by the overall control calculation unit 309.

Figure 12B:
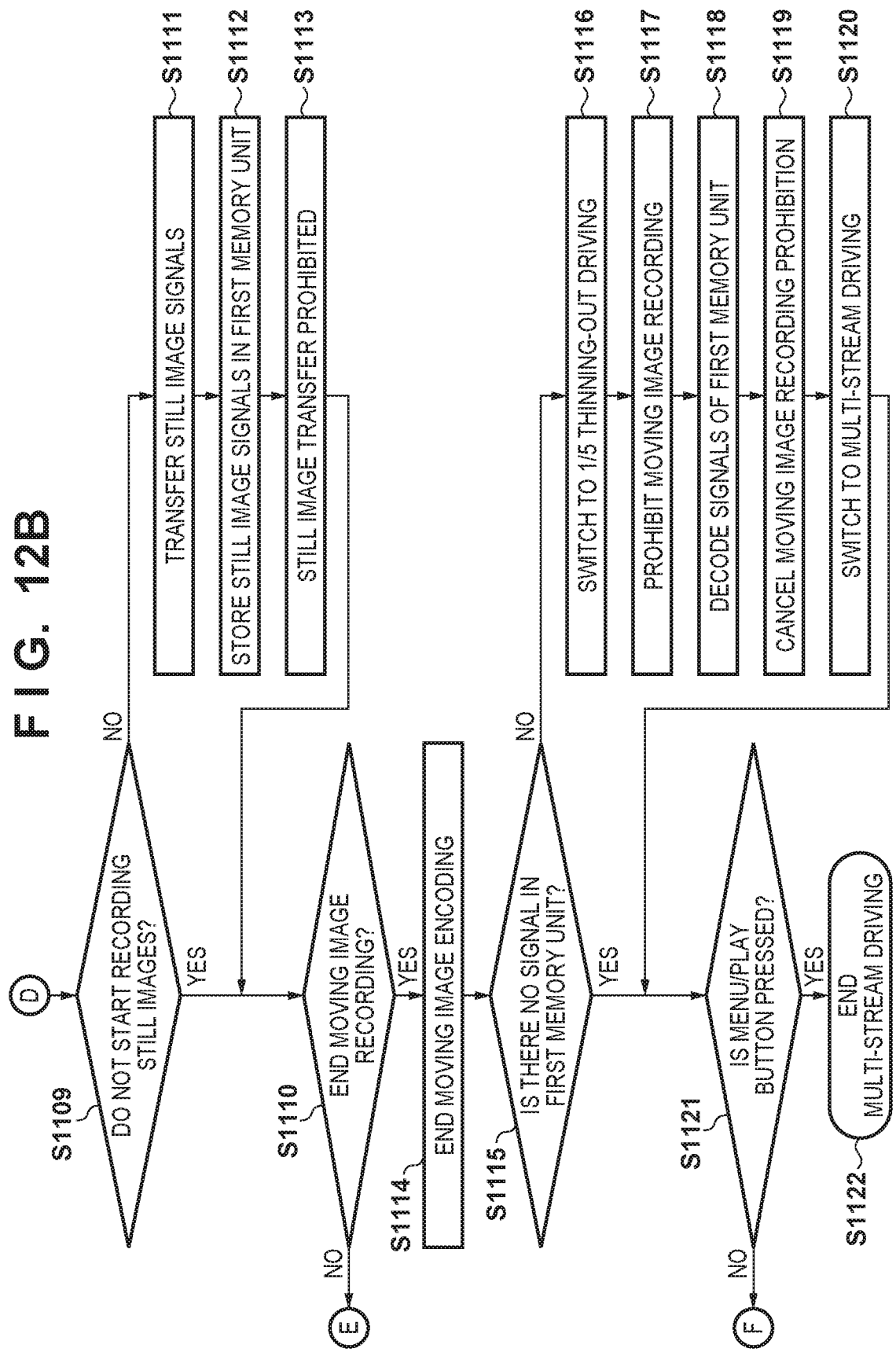

FIGS. 12A and 12B are flowcharts showing the control in FIG. 11. In this embodiment, the image sensor 100 that is in the moving image mode and is waiting for moving image recording operates in multi-stream driving, and, in step S1101, the overall control calculation unit 309 determines whether or not it has been instructed to start recording a moving image. If it is determined in step S1101 that it has been instructed to start recording a moving image, the procedure advances to step S1102, and if it is determined that it has not been instructed to start recording a moving image, a state is entered in which the determination in step S1101 is continuously monitored. In step S1102, encoding of the moving image is started.

In step S1103, it is determined whether or not there is any signal in the first memory unit 308. If there is any signal in the first memory unit 308, the procedure advances to step S1104, and if there is no signal, the procedure advances to step S1108. In step S1104, decoding of the signals in the first memory unit 308 is started.

In step S1105, it is determined whether or not the decoding circuit 316 is used for moving image signals. If it is determined that the decoding circuit 316 is used for moving image signals, the procedure advances to step S1106, and if it is determined that the decoding circuit 316 is not used for moving image signals, decoding of signals in the first memory unit 308 continues. In step S1106, decoding of the signals in the first memory unit 308 is ended, and, in step S1107, the moving image signals are decoded.

On the other hand, in step S1108, it is determined whether or not the decoding circuit 316 is used for moving image signals. If it is determined that the decoding circuit 316 is used for moving image signals, the procedure advances to step S1107, and if it is determined that the decoding circuit 316 is not used, the procedure returns to step S1103.

After the moving image signals are decoded in step S1107, the overall control calculation unit 309 determines in step S1109 whether or not it has been instructed to start still image shooting. If it is determined in step S1109 that it has not been instructed to start still image shooting, the procedure advances to step S1110, and if it is determined that it has been instructed to start still image shooting, the procedure advances to step S1111.

In step S1111, still image signals are transferred to the image capturing signal processing circuit 307, and, in step S1112, the still image signals are stored to the first memory unit 308. In step S1113, transfer of still images is prohibited, and the procedure advances to step S1110.

In step S1110, whether or not to end recording of the moving image is determined, and if recording of the moving image is to be ended, the procedure advances to step S1114, and if recording of the moving image is not to be ended, the procedure returns to step S1103.

In step S1114, encoding of the moving image is ended, and, in step S1115, it is determined whether or not there is any signal in the first memory unit 308. If it is determined in step S1115 that there is no signal in the first memory unit 308, the procedure advances to step S1121, and if it is determined that there are signals, the procedure advances to step S116.

In step S1116, the image sensor 100 is switched to ⅕ thinning-out driving. In step S1117, recording of a moving image is prohibited, and in step S1118, the signals in the first memory unit 308 are decoded. In step S1119, prohibition of recording of a moving image is released, and, in step S1120, the image sensor 100 is switched to multi-stream driving.

In step S1121, it is determined whether or not an operation member in the operation unit 315 such as the menu button or the play button has been pressed. If an operation member has been pressed, multi-stream driving is ended, and the sequence is ended. If no operation member has been pressed, the procedure returns to step S1101.

As described above, according to the above first embodiment, even if the number of decoding circuits of the image capturing signal processing circuit 307 is one, it is possible to process compressed image signals for a moving image size and compressed image signals for a still image size, and it is possible to perform still image shooting without interrupting recording of a moving image.

Second Embodiment

In the first embodiment, a configuration is adopted in which, when compressed moving image signals and still image signals are transferred from the image sensor 100 at the same time, the moving image signals and still image signals are respectively supplied to the image capturing signal processing circuit 307 and the first memory unit 308. On the other hand, in a second embodiment, control performed by an image sensor 100 when the number of decoding circuits of an image capturing signal processing circuit 307 is one will be described. Note that the configuration of an image capturing apparatus in the second embodiment is the same as the first embodiment, and thus a description thereof is omitted.

FIG. 13 is a control timing diagram of the image sensor 100 in the second embodiment. The image sensor 100 operates at 60 fps (frame/second), but moving image signals are transferred to the image capturing signal processing circuit 307 once in two frames.

On the other hand, regarding still image signals, when an instruction that is based on a user operation on an operation unit 315 is received by an overall control calculation unit 309, and if it is determined that still image shooting is to be started, the overall control calculation unit 309 permits the image sensor 100 to transfer still image signals. At this time, the still image signals are transferred using a frame that is not used for transferring moving image signals.

In addition, when an instruction that is based on a user operation on the operation unit 315 is received by the overall control calculation unit 309, and if it is determined that still image shooting is to be ended, the overall control calculation unit 309 prohibits transfer of still image signals of the image sensor 100.

Figure 14:
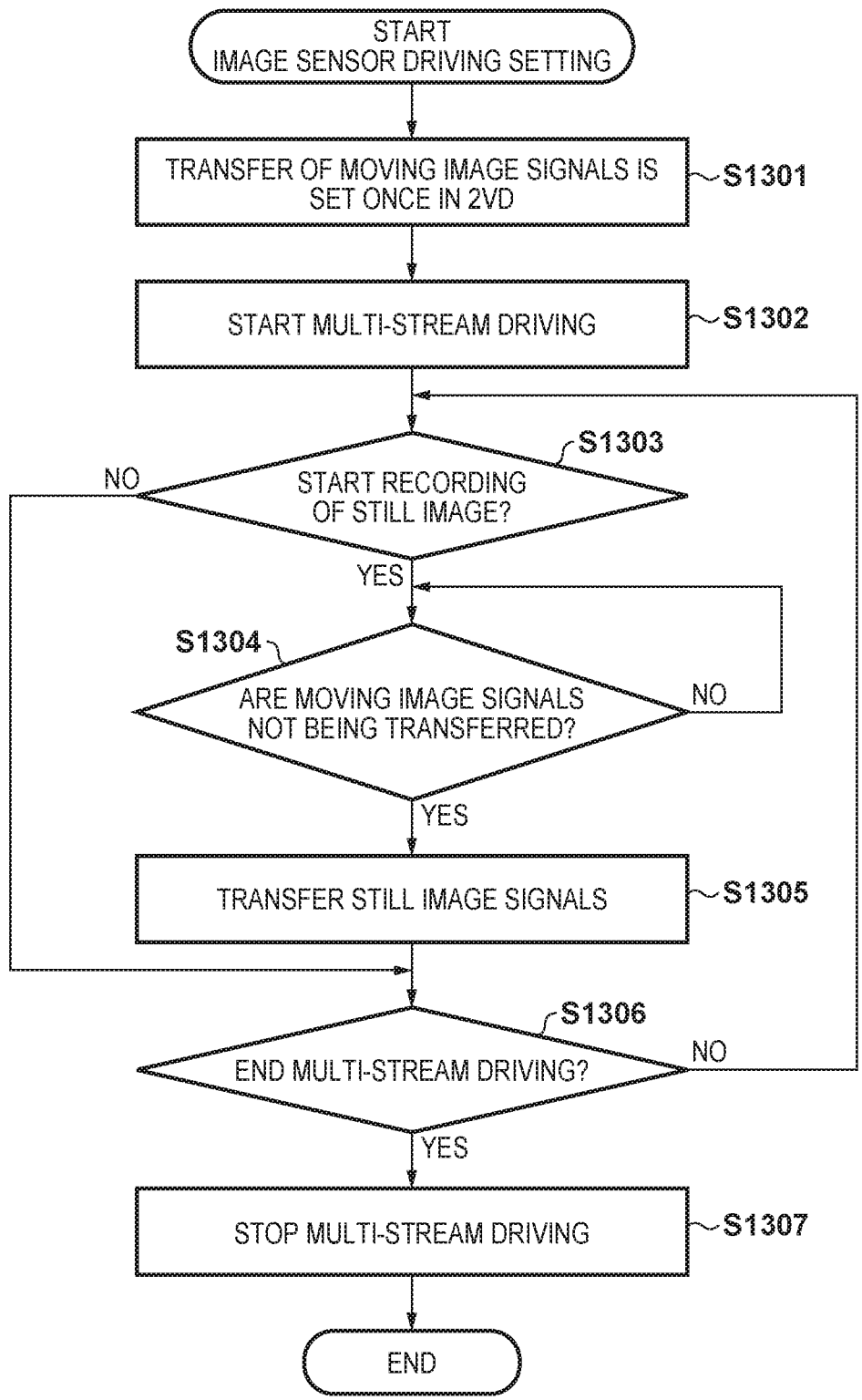
FIG. 14 is a flowchart showing operations of an image capturing apparatus in the second embodiment.

FIG. 14 is a flowchart showing control operations in the second embodiment.

In step S1301, before start of multi-stream driving, setting is performed such that the image sensor 100 transfers moving image signals once in 2 VD (vertical synchronization period) (every other frame).

In step S1302, multi-stream driving is started, and, in step S1303, it is determined whether or not it has been instructed to start recording a still image.

If it is determined in step S1303 that it has been instructed to start recording a still image, the procedure advances to step S1304, and if it has not been instructed to start recording a still image, the procedure advances to step S1306.

In step S1304, it is determined whether or not moving image signals are being transferred, and if moving image signals are not being transferred, the procedure advances to step S1305, and if moving image signals are being transferred, completion of transfer of moving image signals is waited for.

In step S1305, the still image is transferred, and the procedure advances to step S1306.

In step S1306, it is determined whether or not to end multi-stream driving. Whether or not to end multi-stream driving is determined according to whether or not an operation member in the operation unit 315 such as a menu button or a play button has been pressed.

If it is determined in step S1306 that multi-stream driving is to be ended, the procedure advances to step S1307, and if it is determined that multi-stream driving is not to be ended, the procedure returns to step S1303.

In step S1307, multi-stream driving is stopped, and the sequence is ended.

As described above, according to the second embodiment, even if the number of decoding circuits of the image capturing signal processing circuit 307 is one, it is possible to process compressed image signals for a moving image size and compressed image signals for a still image size. Accordingly, it is possible to perform still image shooting without interrupting recording of a moving image.

Third Embodiment

In this third embodiment, control that is handled by an image sensor 100 when the number of decoding circuits of an image capturing signal processing circuit 307 is one similar to the second embodiment will be described. Note that the configuration of an image capturing apparatus in the third embodiment is same as the first embodiment, and thus a description thereof is omitted.

Figure 15:
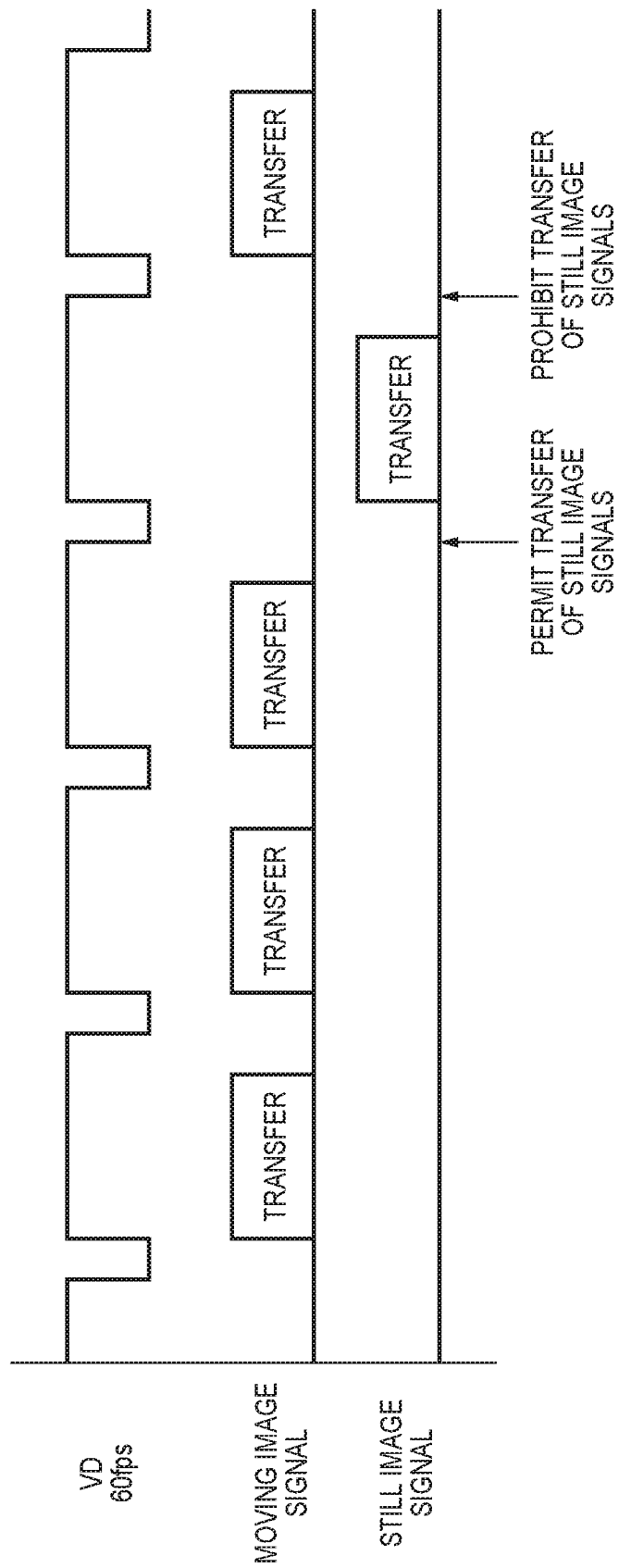
FIG. 15 is a diagram showing control timings of an image sensor in a third embodiment.

FIG. 15 is a control timing diagram of the image sensor 100 in the third embodiment. The image sensor 100 operates at 60 fps (frame/second), and transfers signals to the image capturing signal processing circuit 307 for each frame.

On the other hand, regarding still image signals, when an instruction that is based on a user operation on an operation unit 315 is received by an overall control calculation unit 309, and if it is determined that still image shooting is to be started, the overall control calculation unit 309 permits transfer of still image signals of the image sensor 100, and at the same time, prohibits transfer of moving image signals. When transfer of the still image signals is complete, transfer of moving image signals is started at the same time, and transfer of still image signals is prohibited. For recording a moving image for a frame for which transfer of moving image signals is prohibited, moving image signals for a previous frame are used.

Figure 16:
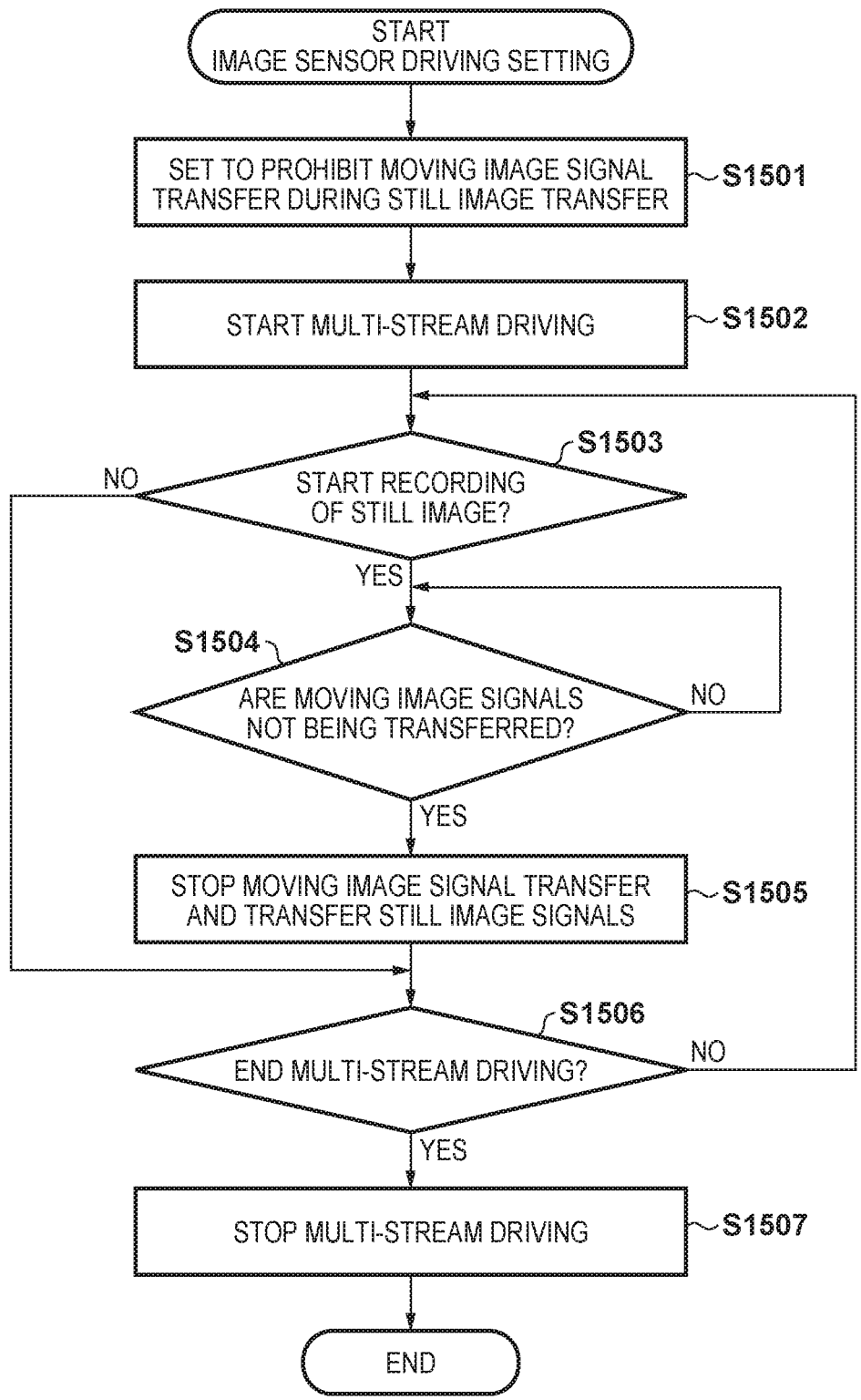
FIG. 16 is a flowchart showing operations of an image capturing apparatus in the third embodiment.

FIG. 16 is a flowchart showing control operations in the third embodiment.

In step S1501, before multi-stream driving is started, setting is performed such that the image sensor 100 does not transfer moving image signals and still image signals at the same time.

In step S1502, multi-stream driving is started, and, in step S1503, it is determined whether or not it has been instructed to start recording a still image. If it is determined in step S1503 that it has been instructed to start recording a still image, the procedure advances to step S1504, and if it has not been instructed to start recording a still image, the procedure advances to step S1506.

In step S1504, it is determined whether or not moving image signals are being transferred. If moving image signals are not being transferred, the procedure advances to step S1505, and if moving image signals are being transferred, completion of transfer of the moving image signals is waited for.

In step S1505, transfer of the moving image signals in the next VD (vertical synchronization signals) is stopped, only still images are transferred, and the procedure advances to step S1506.

In step S1506, it is determined whether or not to end multi-stream driving. Whether or not to end multi-stream driving is determined according to whether or not an operation member in the operation unit 315 such as a menu button or a play button has been pressed.

If it is determined in step S1506 that multi-stream driving is to be ended, the procedure advances to step S1507, and if it is determined that multi-stream driving is not to be ended, the procedure returns to step S1503.

In step S1507, multi-stream driving is stopped, and the sequence is ended.

As described above, according to the third embodiment, even if the number of decoding circuits of the image capturing signal processing circuit 307 is one, it is possible to process compressed image signals for a moving image size and compressed image signals for a still image size. Accordingly, it is possible to perform still image shooting without interrupting recording of a moving image.

Fourth Embodiment

In the second and third embodiments, methods in which the image sensor 100 handles a case where the number of decoding circuits of the image capturing signal processing circuit 307 is one have been described. In this fourth embodiment, description will be given regarding a case where an image sensor 100 has two compression circuits, an image capturing signal processing circuit 307 has two decoding circuits, and they are used selectively. Note that the configuration of an image capturing apparatus in the fourth embodiment is the same as the first embodiment, and thus a description thereof is omitted.

Figure 5:
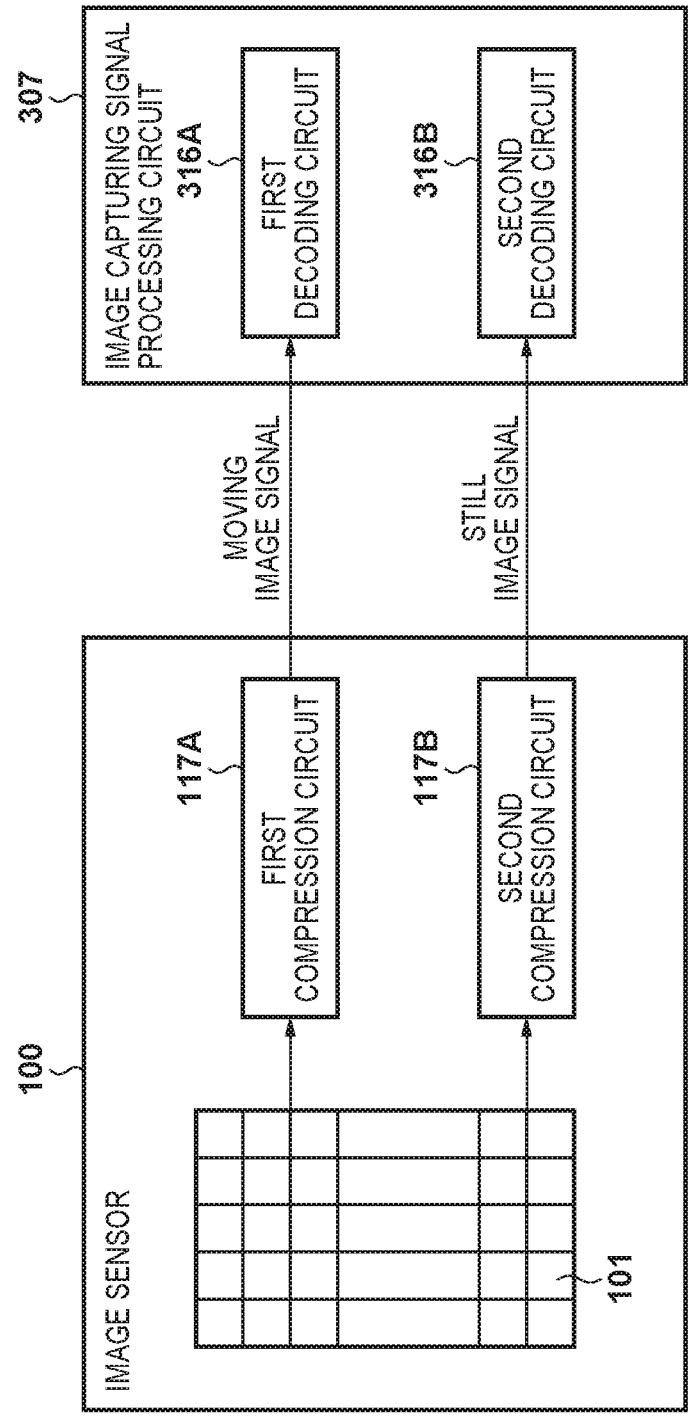
FIG. 5 is a diagram showing a connection state between an image sensor and an image capturing signal processing circuit in a fourth embodiment.

FIG. 5 is a diagram showing the state of connection between the image sensor 100 in this embodiment and the conventional image capturing signal processing circuit 307. The image sensor 100 is provided with a first compression circuit 117A and a second compression circuit 117B. Also, the image capturing signal processing circuit 307 is provided with a first decoding circuit 316A and a second decoding circuit 316B.

FIGS. 17A to 17D are diagrams showing combinations of the number of compression circuits used by the image sensor 100 and the number of decoding circuits used by the image capturing signal processing circuit 307. A method of the first embodiment, the second embodiment, or the third embodiment can be selected according to a combination.

FIG. 17A is a schematic diagram when the image sensor 100 uses two compression circuits, namely the compression circuits 117A and 117B, and the image capturing signal processing circuit 307 uses two decoding circuits, namely the decoding circuits 316A and 316B. In this case, the image sensor 100 can output moving image signals and still image signals at the same time, and the image capturing signal processing circuit 307 can also perform decoding processing at the same time.

FIG. 17B is a schematic diagram when the image sensor 100 uses two compression circuits, namely the compression circuits 117A and 117B, and the image capturing signal processing circuit 307 uses one decoding circuit 316. In this case, a method in which the first memory unit 308 of the first embodiment temporarily stores still image signals, or the method of the second embodiment, or the method of the third embodiment is adopted.

FIG. 17C is a schematic diagram when the image sensor 100 uses one compression circuit 117, and the image capturing signal processing circuit 307 uses two decoding circuits, namely the decoding circuits 316A and 316B. In this case, the method of the second embodiment or the method of the third embodiment is adopted.

FIG. 17D is a schematic diagram when the image sensor 100 uses one compression circuit, and the image capturing signal processing circuit 307 uses one decoding circuit 316. In this case, the method of the second embodiment or method of the third embodiment is adopted.

Note that it is advantageous not to operate one or more compression circuits of the image sensor 100 and one or more decoding circuits of the image capturing signal processing circuit 307 wherever possible, for reducing the power consumption of the image capturing apparatus. For this reason, the user can make a switch for selecting a combination in FIG. 17A, 17B, 17C, or 17D according to a shooting condition, using the operation unit 315.

Specifically, for example, if, in the image capturing signal processing circuit 307, an exposure time determined through AE (automatic exposure control) is shorter than 1/60 seconds, a method for using two compression circuits and two decoding circuits in FIG. 17A is selected. If the exposure time is longer than 1/60 seconds, image signals of each frame are not transferred, and thus one of the methods in FIGS. 17B, 17C, and 17D is selected. Note that, if the method in FIG. 17D is used, the effect for reducing the electrical power is high.

Figure 18:
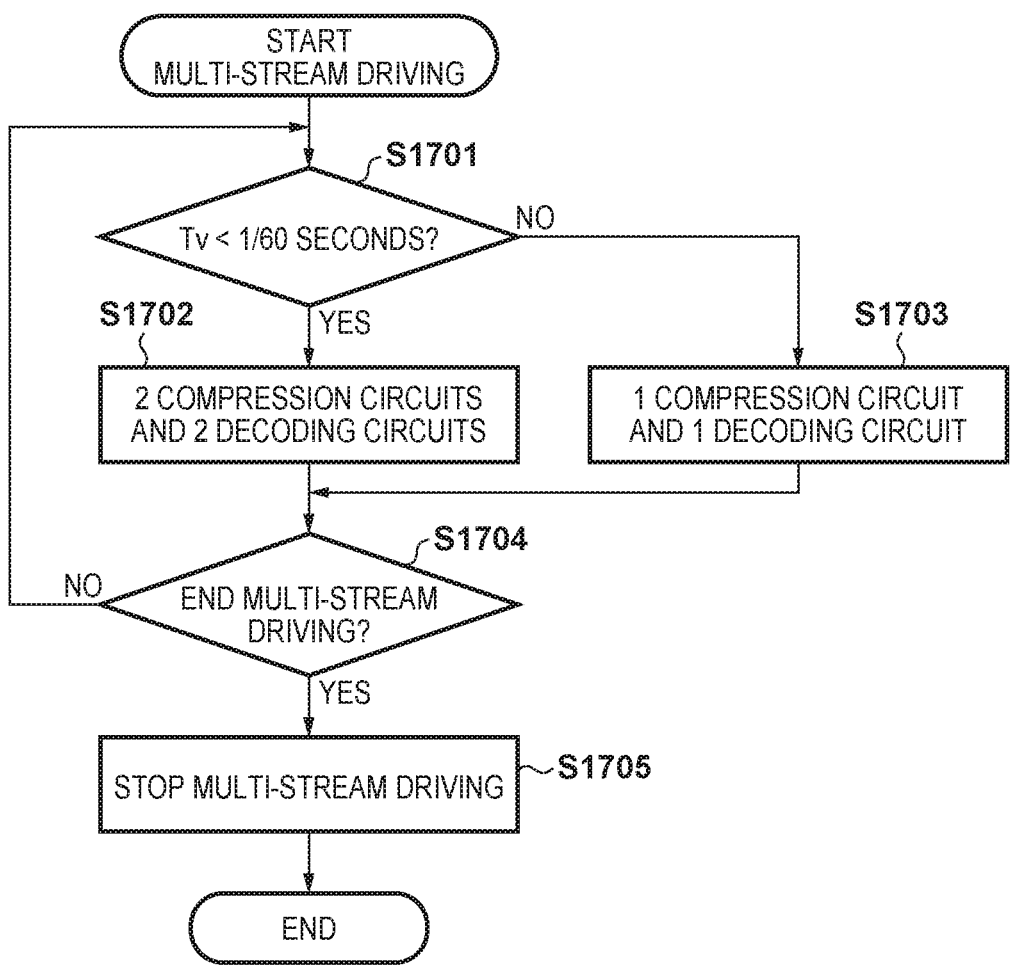
FIG. 18 is a flowchart showing operations of the image capturing apparatus in the third embodiment.

FIG. 18 is a flowchart showing operations of changing methods for using circuits depending on the exposure time. In step S1701, during an operation in multi-stream driving, the image capturing signal processing circuit 307 sets an exposure time, and the overall control calculation unit 309 performs determination regarding the length of the exposure time.

If the exposure time is shorter than 1/60 seconds in step S1701, the procedure advances to step S1702, and if the exposure time is longer than or equal to 1/6 seconds, the procedure advances to step S1703.

In step S1702, the method in FIG. 17A of two compression circuits and two decoding circuits is used.

In step S1703, the method in FIG. 17D of one compression circuit and one decoding circuit is used.

In step S1704, it is determined whether or not to end multi-stream driving. Whether or not to end multi-stream driving is determined according to whether or not an operation member in the operation unit 315 such as a menu button or a play button has been pressed. If it is determined in step S1704 that multi-stream driving is to be ended, the procedure advances to step S1705, and if it is determined that multi-stream driving is not to be ended, the procedure returns to step S1701.

In step S1705, multi-stream driving is stopped, and the sequence is ended.

As described above, according to the fourth embodiment, it is possible to process compressed image signals for a moving image size and compressed image signals for a still image size while reducing the electricity consumption, and it is possible to perform still image shooting without interrupting recording of a moving image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-120038, filed Jun. 25, 2018, and No. 2019-082199, filed Apr. 23, 2019, which are hereby incorporated by reference herein in their entirety.

What is claimed is:

1. An image capturing apparatus comprising:
an image sensor that includes a plurality of pixels for photoelectrically converting light from a subject, a readout circuit capable of performing a first readout operation of reading out a first image signal from the plurality of pixels and a second readout operation of reading out a second image signal for which the number of pixels is larger than the number of pixels for the first image signal, and a compression circuit that generates a first compressed image signal by compressing the first image signal read out by the readout circuit, and generates a second compressed image signal by compressing the second image signal read out by the readout circuit; and
at least one processor or circuit configured to function as:
a decoding unit configured to decode the first compressed image signal and second compressed image signal that have been output from the image sensor, and
a control unit configured to perform control so as to transfer the second compressed image signal to the decoding unit during a period during which the decoding unit is not decoding the first compressed image signal,
wherein the control unit prohibits a moving image recording when the decoding unit is decoding the second compressed image, in a case that a start of a moving image recording is newly instructed after a previous moving image recording has completed.

2. The image capturing apparatus according to claim 1, further comprising:
a storage device that stores the second compressed image signal,
wherein the control unit controls the storage device so as to transfer the second compressed image signal stored in the storage device to the decoding unit during period during which the decoding unit is not decoding the first compressed image signal.

3. The image capturing apparatus according to claim 2, wherein the compression circuit outputs the first compressed image signal and the second compressed image signal at the same time, and the control unit transfers the first compressed image signal to the decoding unit, and causes the storage device to store the second compressed image signal.

4. The image capturing apparatus according to claim 2, wherein the control unit reads out the second compressed image signal from the storage device during a vertical synchronization period of the first image signal, and causes the decoding unit to decode the second compressed image signal.

5. The image capturing apparatus according to claim 1, wherein the control unit prohibits readout of the first image signal when the decoding unit is decoding the second compressed image signal.

6. The image capturing apparatus according to claim 1, wherein, if a user instructs to capture an image of the second image signal while an image of the first image signal is being captured, the control unit causes the second image signal to be read out from the image sensor.

7. The image capturing apparatus according to claim 1, wherein the control unit controls the readout circuit so as to transfer the second compressed image signal to the decoding unit during a period during which the decoding unit is not decoding the first compressed image signal.

8. The image capturing apparatus according to claim 7, wherein the control unit prohibits readout of the first image signal while the readout circuit is reading out the second image signal.

9. The image capturing apparatus according to claim 1, wherein the compression circuit has two compression circuits, the decoding unit has two decoding circuits, and the control unit switches the number of compression circuits used in the compression circuit and the number of decoding circuits used in the decoding unit according to a shooting condition.

10. The image capturing apparatus according to claim 9, wherein the control unit switches the number of compression circuits used in the compression circuit and the number of decoding circuits used in the decoding unit according to a length of an exposure time of the image sensor.

11. The image capturing apparatus according to claim 1, wherein the first image signal is a moving image signal, and the second image signal is a still image signal.

12. An image capturing apparatus comprising:
an image sensor that includes a plurality of pixels for photoelectrically converting light from a subject, a readout circuit capable of performing a first readout operation of reading out a first image signal from the plurality of pixels and a second readout operation of reading out a second image signal for which the number of pixels is larger than the number of pixels for the first image signal, and a compression circuit that generates a first compressed image signal by compressing the first image signal read out by the readout circuit, and generates a second compressed image signal by compressing the second image signal read out by the readout circuit and
at least one processor or circuit configured to function as:
a decoding unit configured to decode the first compressed image signal and second compressed image signal that have been output from the image sensor, and
a control unit configured to perform control so as to transfer the second compressed image signal to the decoding unit during a period during which the decoding unit is not decoding the first compressed image signal,
wherein the readout circuit reads out the first image signal for every other frame, and the compression circuit transfers, to the decoding unit, the second compressed image signal that is based on a second image signal read out using a frame for which the first image signal is not read out.

13. A method for controlling an image capturing apparatus that includes an image sensor that includes a plurality of pixels for photoelectrically converting light from a subject, the method comprising:
- a first readout operation of reading out a first image signal from the plurality of pixels;
- a second readout operation of reading out a second image signal for which the number of pixels is larger than the number of pixels for the first image signal;
- generating a first compressed image signal by compressing the first image signal read out in the first readout operation, and generating a second compressed image signal by compressing the second image signal read out in the second readout operation;
- decoding the first compressed image signal and second compressed image signal; and
- performing control so as to transfer the second compressed image signal for the decoding during a period during which the first compressed image signal is not decoded in the decoding,
- wherein in the performing control, a moving image recording is prohibited when the decoding of the second compressed image is executed, in a case that a start of a moving image recording is newly instructed after a previous moving image recording has completed.

* * * * *